US011891836B2

(12) United States Patent
Cunerty

(10) Patent No.: US 11,891,836 B2
(45) **Date of Patent: *Feb. 6, 2024**

(54) SPA ACCESSORY MOUNTING ASSEMBLY

(71) Applicant: 1140398 Ontario Ltd., Mississauga (CA)

(72) Inventor: John Joseph Cunerty, Toronto (CA)

(73) Assignee: 1140398 ONTARIO LTD., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,437

(22) Filed: Jun. 20, 2022

(65) Prior Publication Data

US 2022/0325547 A1 Oct. 13, 2022

Related U.S. Application Data

(63) Continuation of application No. 16/591,941, filed on Oct. 3, 2019, now Pat. No. 11,391,054.

(Continued)

(51) Int. Cl.
*E04H 4/08* (2006.01)
*A47G 25/12* (2006.01)
(Continued)

(52) U.S. Cl.
CPC ............. *E04H 4/084* (2013.01); *A47G 25/12* (2013.01); *A47K 10/04* (2013.01); *A61H 33/6005* (2013.01)

(58) Field of Classification Search
CPC ........ E04H 4/084; A47G 25/12; A47K 10/04; A47K 3/001; A47K 3/003; A47K 3/004; A61H 33/6005
See application file for complete search history.

(56) References Cited

U.S. PATENT DOCUMENTS 467,991 A 2/1892 Frederick
566,809 A 9/1896 Strong
(Continued)

FOREIGN PATENT DOCUMENTS

CA 2053858 9/1991
CA 2098974 12/1994
(Continued)

OTHER PUBLICATIONS

Written Opinion and International Search Report of International Application No. PCT/CA2015/051126 dated Feb. 5, 2016.

(Continued)

*Primary Examiner* — Ko H Chan
(74) *Attorney, Agent, or Firm* — BERESKIN & PARR LLP/S.E.N.C.R.L., s.r.l.

(57) ABSTRACT

A spa accessory mounting assembly includes a lower anchor, and upright support, and an accessory mount. The lower anchor having a horizontal foot positionable under a spa. The upright support having a lower portion connected to the lower anchor, and an upper end positioned above the lower anchor. The accessory mount is connected to the upright support. At least one of: (i) the upright support is movable relative to the lower anchor between at least two upright support elevations, and the upright support is rigidly connectable to the lower anchor at each of the upright support elevations; and (ii) the accessory mount is movable relative to the upright support between at least two accessory mount elevations, and the accessory mount is rigidly connectable to the upright support at each of the accessory mount elevations.

20 Claims, 15 Drawing Sheets

Related U.S. Application Data

(60) Provisional application No. 62/751,195, filed on Oct. 26, 2018.

(51) Int. Cl.
*A47K 10/04* (2006.01)
*A61H 33/00* (2006.01)

(56) References Cited

U.S. PATENT DOCUMENTS

| | | | | |
|---|---|---|---|---|
| 1,641,514 A | | 9/1927 | Wiebmer | |
| 2,504,319 A | | 4/1950 | Freeman | |
| 3,918,108 A | | 11/1975 | Feyerherm | |
| 3,954,182 A | | 5/1976 | McEvers | |
| 4,163,295 A | | 8/1979 | Schiitz | |
| 4,659,084 A | * | 4/1987 | Vuick | A63B 69/3608 473/271 |
| 4,853,985 A | | 8/1989 | Perry | |
| 4,991,238 A | | 2/1991 | Forrest | |
| 5,029,740 A | | 7/1991 | Cox | |
| 5,039,105 A | * | 8/1991 | Ro | A63B 69/3621 473/258 |
| 5,048,131 A | | 9/1991 | Stephen | |
| 5,048,153 A | | 9/1991 | Wall et al. | |
| 5,131,102 A | | 7/1992 | Sailey et al. | |
| 5,224,636 A | | 7/1993 | Bounds | |
| 5,339,494 A | | 8/1994 | Esau | |
| 5,367,722 A | | 11/1994 | Pesterfield | |
| 5,373,590 A | | 12/1994 | Svae et al. | |
| 5,439,226 A | * | 8/1995 | Luedtke | A63B 69/0057 473/211 |
| 5,471,685 A | | 12/1995 | Cross | |
| 5,485,993 A | * | 1/1996 | Lipsett | A63B 69/0071 473/448 |
| 5,507,044 A | | 4/1996 | Williamson et al. | |
| 5,517,703 A | | 5/1996 | Ouelette | |
| 5,566,403 A | | 10/1996 | Black et al. | |
| 5,584,081 A | | 12/1996 | Ouelette | |
| 5,634,218 A | | 6/1997 | Ouelette | |
| 5,644,803 A | | 7/1997 | Wilson | |
| 5,657,884 A | * | 8/1997 | Zilincar, III | A47F 5/0068 211/86.01 |
| 5,689,841 A | | 11/1997 | Black et al. | |
| 5,745,932 A | | 5/1998 | Barovetto | |
| 5,800,291 A | * | 9/1998 | Grover | A63B 69/0071 473/422 |
| 5,819,332 A | | 10/1998 | Perry | |
| 5,924,964 A | * | 7/1999 | Hayden | A63B 21/078 482/142 |
| 5,950,252 A | | 9/1999 | Fettes | |
| 5,974,599 A | | 11/1999 | Tudor | |
| 5,974,600 A | | 11/1999 | Pucci | |
| 5,996,137 A | | 12/1999 | Genova | |
| 6,000,071 A | | 12/1999 | Fettes | |
| 6,000,072 A | | 12/1999 | LaHay | |
| 6,032,305 A | | 3/2000 | Tedrick | |
| 6,039,293 A | | 3/2000 | Minet | |
| RE36,669 E | | 4/2000 | Zilincar, III | |
| 6,093,111 A | * | 7/2000 | Senn | A63B 69/3623 473/270 |
| 6,149,556 A | * | 11/2000 | Jordan | A63B 71/0036 482/106 |
| 6,158,063 A | | 12/2000 | Tudor | |
| 6,195,811 B1 | | 3/2001 | Dragovic | |
| 6,202,570 B1 | * | 3/2001 | Kurtsman | H04Q 1/08 211/187 |
| 6,312,349 B1 | * | 11/2001 | Roberts | A63B 63/083 473/448 |
| 6,381,766 B1 | | 5/2002 | Perry | |
| 6,442,799 B1 | | 9/2002 | Duarte | |
| 6,565,060 B2 | | 5/2003 | Li et al. | |
| 6,595,865 B2 | * | 7/2003 | Stitz | A63B 69/0057 473/266 |
| 6,601,834 B2 | | 8/2003 | Perry | |
| 6,718,566 B1 | | 4/2004 | Wilson | |
| 6,795,984 B1 | | 9/2004 | Brady | |
| 6,932,712 B2 | * | 8/2005 | Cardosi | A63B 69/3667 473/270 |
| 6,938,281 B1 | | 9/2005 | Tudor | |
| 6,974,043 B1 | | 12/2005 | Lai | |
| 6,988,957 B2 | * | 1/2006 | Bender | A63B 69/3621 473/277 |
| 7,461,417 B2 | | 12/2008 | Godbersen | |
| 7,666,106 B1 | * | 2/2010 | Hebert | A63B 69/0059 473/274 |
| 7,784,120 B2 | | 8/2010 | Spicer | |
| 7,987,538 B1 | | 8/2011 | Kimball | |
| 8,516,626 B2 | | 8/2013 | Gardenier et al. | |
| 8,590,080 B1 | | 11/2013 | Staresinic | |
| 9,181,721 B2 | | 11/2015 | Spicer | |
| D757,612 S | * | 5/2016 | Woller | D12/106 |
| 9,578,999 B2 | | 2/2017 | Schwartz | |
| 9,644,382 B1 | * | 5/2017 | Turner | E04H 4/084 |
| 9,708,823 B2 | | 7/2017 | Cunerty et al. | |
| 10,207,172 B2 | * | 2/2019 | Hillson | A63B 21/06 |
| 10,272,312 B2 | * | 4/2019 | Burdette | A63B 63/08 |
| 10,273,702 B1 | | 4/2019 | Cunerty | |
| 10,507,352 B2 | * | 12/2019 | Kimura | A63B 21/072 |
| 10,638,630 B2 | * | 4/2020 | Roberts | H05K 5/0217 |
| 11,103,739 B2 | * | 8/2021 | Shaw, Jr. | A63B 23/12 |
| 11,406,862 B2 | * | 8/2022 | Downing | A63B 21/0783 |
| 2002/0050003 A1 | | 5/2002 | Perry | |
| 2003/0150054 A1 | | 8/2003 | Tudor | |
| 2004/0055081 A1 | | 3/2004 | Wilson | |
| 2004/0143895 A1 | | 7/2004 | Loyd et al. | |
| 2007/0017016 A1 | | 1/2007 | Piche | |
| 2007/0022524 A1 | | 2/2007 | Duarte et al. | |
| 2007/0079434 A1 | | 4/2007 | Pellerin | |
| 2007/0107118 A1 | | 5/2007 | Tudor | |
| 2007/0209104 A1 | | 9/2007 | Buzzetti et al. | |
| 2008/0222791 A1 | | 9/2008 | Godbersen | |
| 2008/0244820 A1 | | 10/2008 | Moore | |
| 2009/0126097 A1 | | 5/2009 | Kanetis | |
| 2010/0186159 A1 | | 7/2010 | Dalickas | |
| 2011/0048654 A1 | | 3/2011 | Kolar | |
| 2011/0239360 A1 | | 10/2011 | Gramatikopoulos | |
| 2013/0117922 A1 | | 5/2013 | Spicer | |
| 2014/0123380 A1 | | 5/2014 | Cunerty | |
| 2015/0184411 A1 | | 7/2015 | Muller | |
| 2016/0053505 A1 | | 2/2016 | Dose | |
| 2016/0123027 A1 | | 5/2016 | Cunerty et al. | |

FOREIGN PATENT DOCUMENTS

| | | | |
|---|---|---|---|
| CA | 2155988 | | 5/1996 |
| CA | 2282012 | | 9/1999 |
| CA | 2298306 | | 1/2001 |
| CA | 2421332 | A1 | 9/2003 |
| CA | 2537640 | A1 | 8/2007 |
| CN | 203487817 | U | 3/2014 |
| EP | 2078811 | A2 | 7/2009 |
| WO | 9113224 | | 9/1991 |
| WO | 2016074001 | A1 | 5/2016 |

OTHER PUBLICATIONS

"Ultralift HM Cover Lifter Hydraulic Mount", Parts List, Byron Originals dated Oct. 1, 2012.

Office Action issued for Canadian Patent Application No. 2,965,723 dated May 24, 2017.

Office Action issued for Canadian Patent Application No. 2,965,723 dated Oct. 5, 2018.

Office Action issued for Canadian Patent Application No. 2,965,723 dated Feb. 2, 2018.

Office Action issued for Canadian Patent Application No. 2,966,668 dated Jun. 28, 2018.

Office Action issued for Canadian Patent Application No. 2,966,668 dated Jan. 7, 2019.

Office Action issued for Canadian Patent Application No. 2,966,668 dated Apr. 23, 2019.

(56) References Cited

OTHER PUBLICATIONS

Supplementary European Search for EP Application No. 15857299 dated Jun. 29, 2018.
Search and Exam Report for UK Application No. GB1904924.6 dated Sep. 20, 2019.
COVER-UP! advertisements, 2 pgs., no date given.
Installation Instructions for the COVER-UP!, 4 pgs., no date given.
Cover Caddy advertisement, 1 pg., no date given.
Cover Caddy Assembly & Mounting instructions, 3 pgs., no date given.
Combined Search and Examination Report of GB Patent Application No. 1915578.7, dated Apr. 9, 2020, 6 pages.
Covermate I advertisement, 2 pgs., no date given.
Installation Instructions for the Covermate I, 4 pgs., no date given.
Covermate II advertisement, 2 pgs., no date given.
Installation Instructions for the Covermaste II, 7 pgs., no date given.
Installation Instructions for the Covermate III, 4 pgs., no date given.
The Cover Valet advertisement, 2 pgs., no date given.
Installation Instructions for the Cover Valet, 3 pgs., no date given.
The Ideal E-Z Lifter advertisement, 2 pgs., no date given.
The Ideal E-Z Lifter Installation Instructions, 4 pgs., no date given.
The Ideal Cover Lift advertisement, 2 pgs., no date given.
The Ideal Cover Lift Installation Instructions, 4 pgs., no date given.
COVER ROCK-IT advertisement, 1 pg., no date given.
COVER ROCK-IT Assembly and Installation Instructions, 4 pgs., no date given.
Superlift2 advertisement, 1 pg., no date given.
Superlift2 Installation Guide, 7 pgs., no date given.

* cited by examiner

SPA ACCESSORY MOUNTING ASSEMBLY

This application claims the benefit of Provisional Application Ser. No. 62/751,195, filed Oct. 26, 2018, which is hereby incorporated herein by reference.

FIELD

This application relates to the field of spa accessory mounting assemblies.

INTRODUCTION

A spa may be installed with one or more accessories. For example, one or more cover lifters may be attached to an exterior of a spa for providing assistance in moving one or more spa covers between a closed position and an open position.

DRAWINGS

SUMMARY

Figure 1:
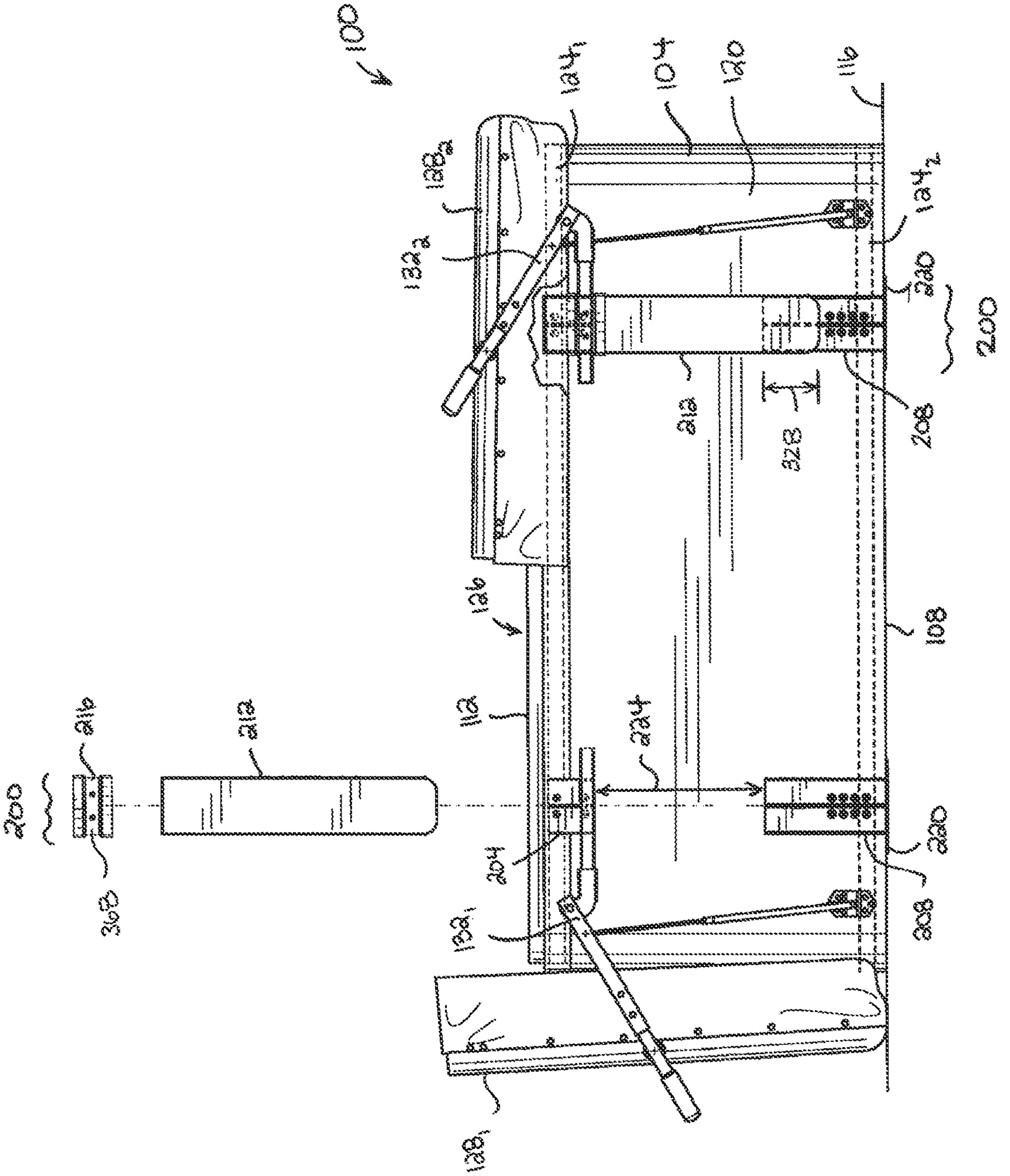
FIG. 1 is a side elevation view of a spa, in which two spa accessory mounting assemblies are shown, one in exploded form and one assembled, and in which cover lifters are shown, one in an open position and one in a closed position.

In one aspect, a spa accessory mounting assembly is provided. The spa accessory mounting assembly may include an upper frame anchor, a lower frame anchor, a bridging sleeve, and an accessory mount. The upper frame anchor may be securable to an upper internal frame of a spa. The lower frame anchor may be securable to a lower internal frame of a spa. The bridging sleeve may be sized and shaped to overlie both the upper and lower frame anchors when the upper frame anchor is spaced vertically above the lower frame anchor. The accessory mount may be connected to the bridging sleeve and positionable along a height of the bridging sleeve.

In another aspect, a spa accessory mounting assembly is provided. The spa accessory mounting assembly may include an upper frame anchor, a lower anchor, a bridging sleeve, and an accessory mount. The upper frame anchor may be securable to an upper internal frame of a spa. The lower anchor may having a horizontal foot positionable under a spa. The bridging sleeve may be sized and shaped to mount to both the upper frame anchor and lower anchor when the upper frame anchor is spaced vertically above the lower anchor. The accessory mount may be connected to the bridging sleeve and moveable along a height of the bridging sleeve.

In another aspect, a spa accessory mounting assembly is provided. The spa accessory mounting assembly may include a lower anchor, an upright support, and an accessory mount. The lower anchor may have a horizontal foot positionable under a spa. The upright support may have a lower portion connected to the lower anchor, and an upper end positioned above the lower anchor. The accessory mount may be connected to the upright support. At least one of: the upright support is movable relative to the lower anchor between at least two upright support elevations, and the upright support is rigidly connectable to the lower anchor at each of the upright support elevations; and the accessory mount is movable relative to the upright support between at least two accessory mount elevations, and the accessory mount is rigidly connectable to the upright support at each of the accessory mount elevations.

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a group of elements are said to 'collectively' perform an act where that act is performed by any one of the elements in the group, or performed cooperatively by two or more (or all) elements in the group.

As used herein and in the claims, a first element is said to be "received" in a second element where at least a portion of the first element is received in the second element unless specifically stated otherwise.

Some elements herein may be identified by a part number, which is composed of a base number followed by an alphabetical or subscript-numerical suffix (e.g. 112*a*, or $\mathbf{112}_1$). Multiple elements herein may be identified by part numbers that share a base number in common and that differ by their suffixes (e.g. $\mathbf{112}_1$, $\mathbf{112}_2$, and $\mathbf{112}_3$). All elements with a common base number may be referred to collectively or generically using the base number without a suffix (e.g. 112).

Historically, side wall panels on spas (e.g. hot tubs or swim spas) have been made of rigid wooden panels capable of withstanding heavy loads of attached spa accessories, such as cover lifters. This allowed such spa accessories to be fastened to the side wall panels at any location required by the spa accessory. For example, a cover lifter may require that it is attached to the side wall panel at a particular elevation (i.e. height position) so that its arcuate motion is able to carry the attached spa cover between open and closed positions without interference.

Recently, spas are more often sold with side wall panels made of thin polymers that are backed by a rigid internal frame. Such weak polymer side wall panels are often unable to support heavy loads of an attached spa accessory. Further, the rigid internal frame is typically located at the upper and lower ends of the side wall panels, and as such do not provide suitable attachment locations for many spa accessories.

One solution for mounting spa accessories to spas that have weak side wall panels is to add additional internal framing behind the side wall panels. This entails removing the spa side wall panels, installing the additional framing (e.g. wooden or metal studs), reinstalling the spa side walls, and then mounting the spa accessory over the side wall panel in alignment with the added framing. This solution has several disadvantages. It is time consuming to perform, too complicated and involved for most consumers, and the interior configuration of some spas may not accommodate additional internal framing at locations required by the spa accessory.

Embodiments herein relate to a spa accessory mounting assembly designed for compatibility with modern spas that may have weak side panels supported on internal framing. This allows the assembly to mount a spa accessory (e.g. cover lifter) at any required elevation (i.e. height position) without ever having to remove the side wall panels, and without having to add additional internal framing behind the side wall panels. As compared with processes that involve reinforcing the side wall panels with additional internal framing, the spa accessory mounting assembly disclosed herein makes the installation of a spa accessory quick, easy enough for most consumers, and compatible with spas that cannot accommodate additional internal framing at locations where the spa accessory requires fastening to the spa.

FIG. 1 shows an exemplary spa 100. As shown, spa 100 has a side wall 104 that extends between a lower spa end 108 and an upper spa end 112. Lower spa end 108 sits on a ground surface 116, which may be a natural ground surface (e.g. soil, clay, or grass) or a manmade floor covering (e.g. asphalt, concrete, tile, or wood). Upper spa end 112 provides an opening 126 for users to enter and exit the spa 100. Spa 100 may include one or more thermally insulated covers 128 that can be seated over the upper spa end 112 to mitigate the escape of heat from the heated water inside and the entry of debris (e.g. leaves) when the spa is not in use.

Spa covers 128 can be very heavy, often weighing 40-100 lbs (18-45 kg) depending on their size and composition. This makes moving spa covers 128 between an open position (e.g. the illustrated position of spa cover $\mathbf{128}_1$) and a closed position (e.g. the illustrated position of spa cover $\mathbf{128}_2$) difficult or impossible for many users. For that reason, a cover lifter 132 may be installed to assist the user in moving the cover between the open position (in which cover 128 is clear of opening 126) and the closed position (in which cover 128 overlies (e.g. closes) at least part of opening 126). As shown, a spa cover lifter 132 may be fastened to the side wall 104 of the spa 100 at a location between the lower and upper spa ends 108. In use, the cover lifter 132 may at times bear much or all of the total weight of the spa cover 128 it is used to lift. This weight may be transferred to the side wall 104 where the cover lifter 132 is anchored. Lifter 132 may be a lift assembly as described in U.S. Pat. No. 9,708,823, the entirety of which is hereby incorporated by reference.

Still referring to FIG. 1, the design of cover lifter 132 may require that it is positioned at a specified elevation between the lower and upper spa ends 108 and 112. This elevation (also referred to as 'height') may depend upon the movement profile of the cover lifter 132 between the closed and open positions, the dimensions of the spa cover 128, and the connection between the cover lifter 132 and the spa cover 128, among other factors. As described above, spas have historically had robust side wall panels that can support the load of burdensome spa accessories, such as a cover lifter 132, regardless of where the spa accessory was mounted to the side wall panels. However, new spas have less robust side wall panels and the rigid internal framing 124 is not normally located at positions matching the installation requirements of spa accessories (e.g. cover lifter 132).

The illustrated example shows a side wall 104 that includes one or more side wall panels 120 mounted to and exterior of internal framing 124. As shown, internal framing 124 may include an upper internal frame $\mathbf{136}_1$ and a lower internal frame $\mathbf{136}_2$. Upper and lower internal frames $\mathbf{136}_1$ and $\mathbf{136}_2$ may extend laterally (e.g. horizontally) proximate the upper and lower spa ends 112 and 108 respectively (e.g. parallel to upper and lower spa ends 112 and 108, respectively). In this example, cover lifter 132 may require that it is mounted at an elevation between the upper and lower internal frames $\mathbf{136}_1$ and $\mathbf{136}_2$ in order to provide the articulation required to move the connected spa cover 128 between the closed position and the open position. As shown, there may be several cover lifters 132 to provide assisted movement for several spa covers 128. In many instances, there may be two cover lifters 132 connected to opposed ends of each spa cover 128.

In other spa configurations, there may be additional horizontal or vertical internal frames 136. Internal frames 136 can be discrete elements connected to each other, or integrally formed with each other. Internal frames 136 may have any configuration suitable to structurally reinforce spa side wall panels 120. For example, internal frames 136 may studs as shown, such as wooden or metal studs.

Figure 2:
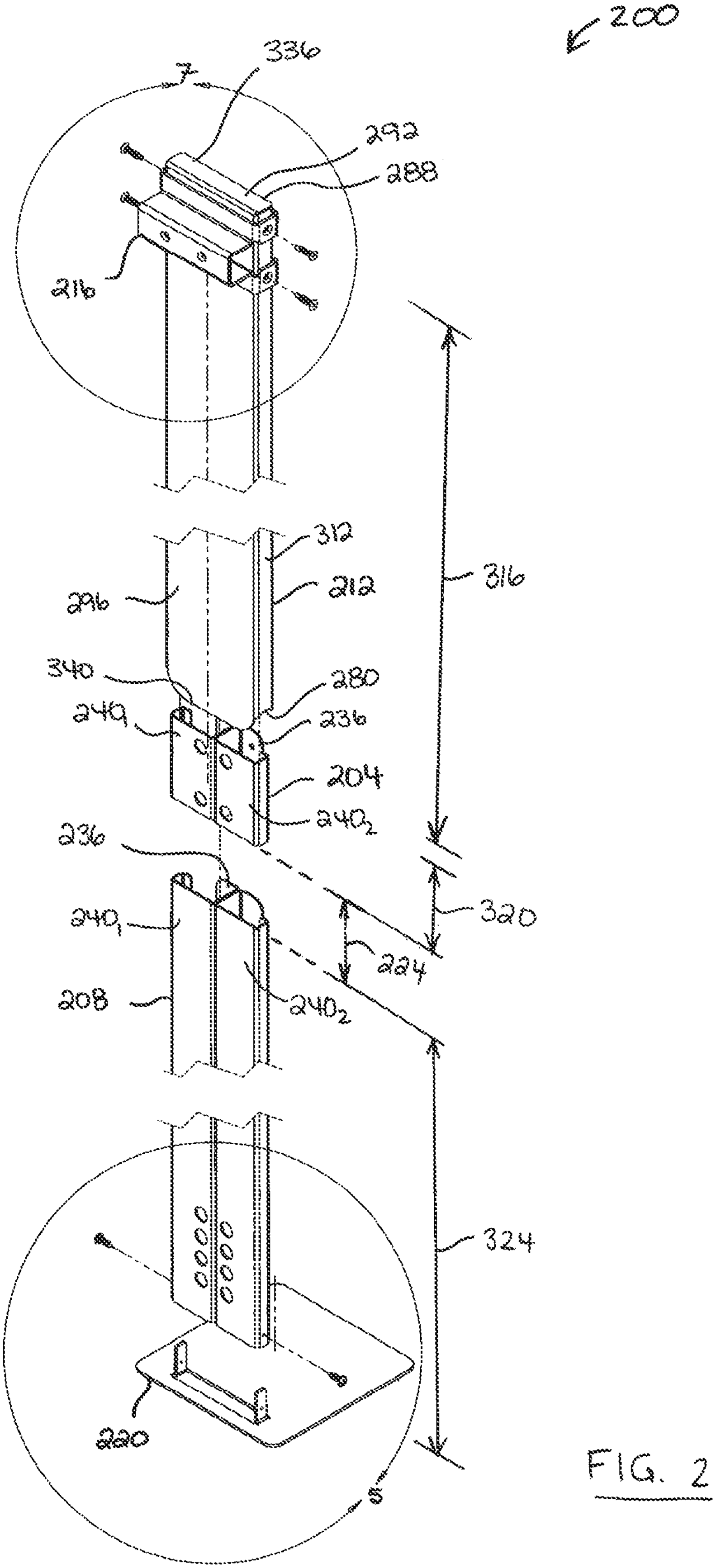
FIG. 2 is an exploded view of a spa accessory mounting assembly of FIG. 1.
Figure 3A:
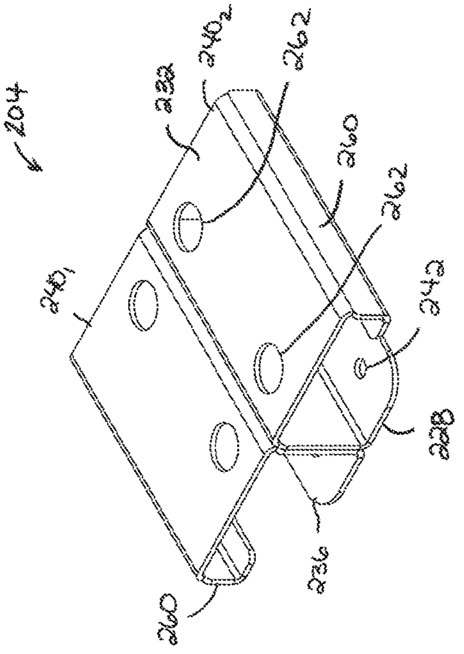
FIG. 3A is a perspective view of an upper frame anchor of the spa accessory mounting assembly of FIG. 2.
Figure 3B:
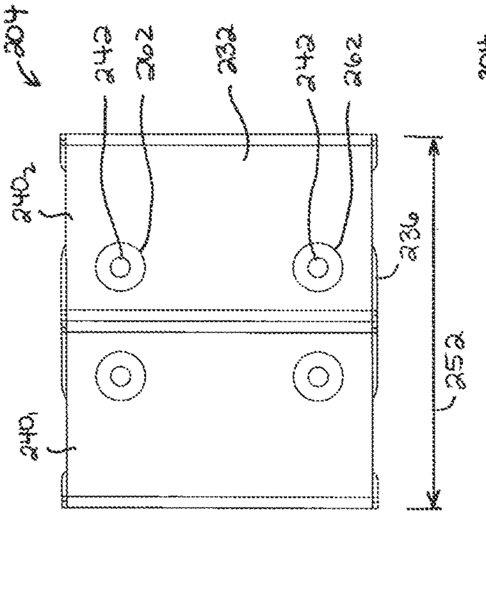
FIG. 3B is a front elevation view of the upper frame anchor of FIG. 3A.
Figure 3C:
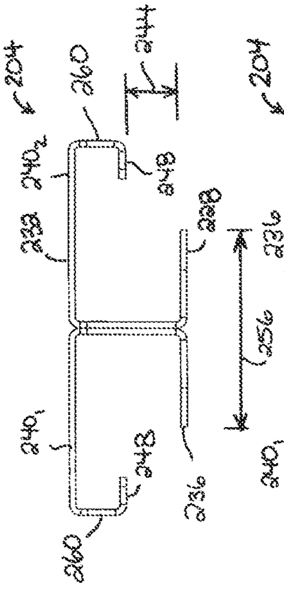
FIG. 3C is a top plan view of the upper frame anchor of FIG. 3A.
Figure 3D:
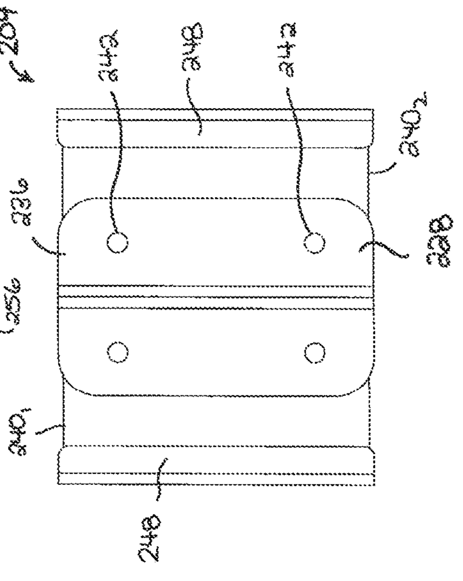
FIG. 3D is a rear elevation view of the upper frame anchor of FIG. 3A.
Figure 4A:
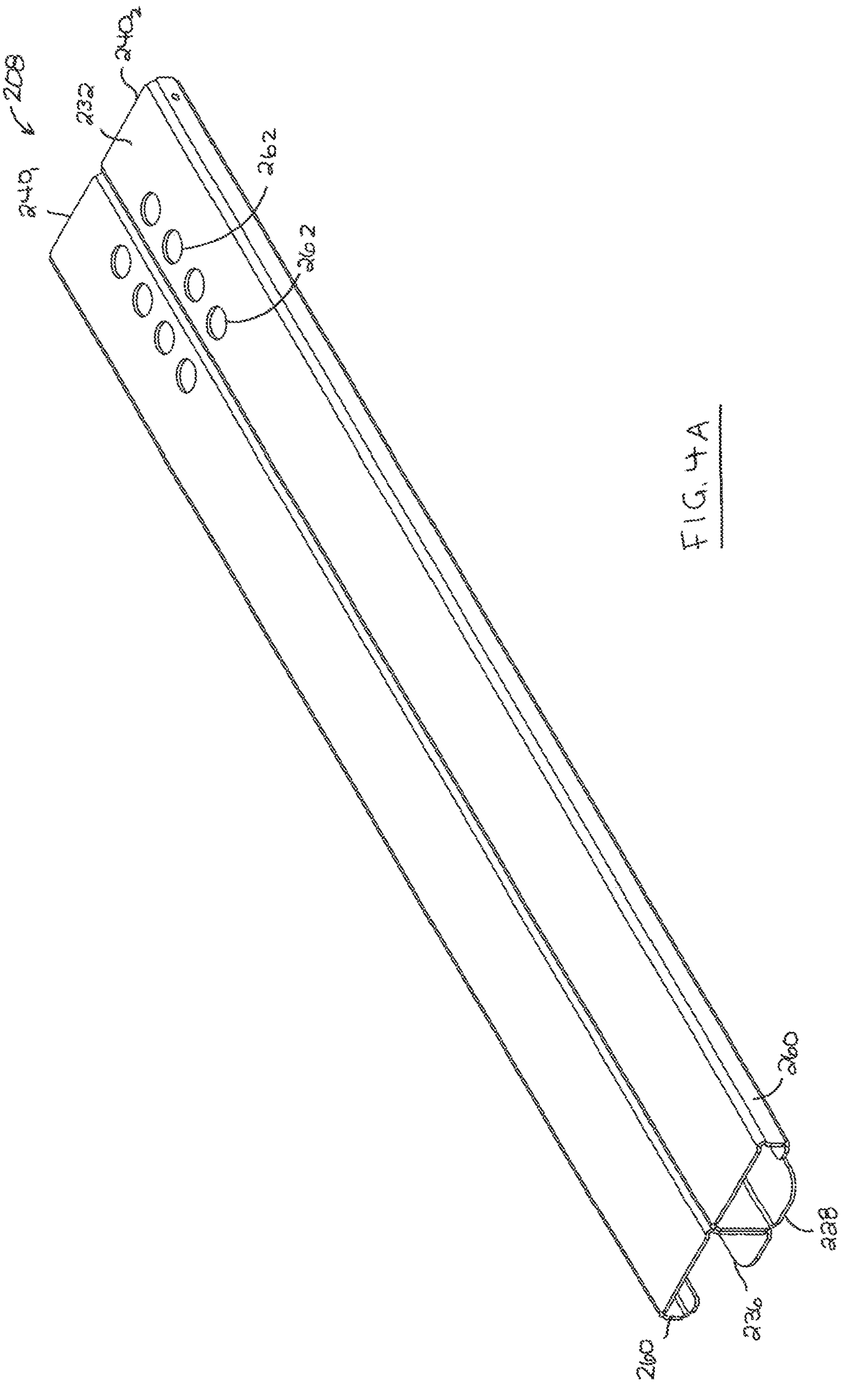
FIG. 4A is a perspective view of a lower anchor in accordance with an embodiment.
Figure 4E:
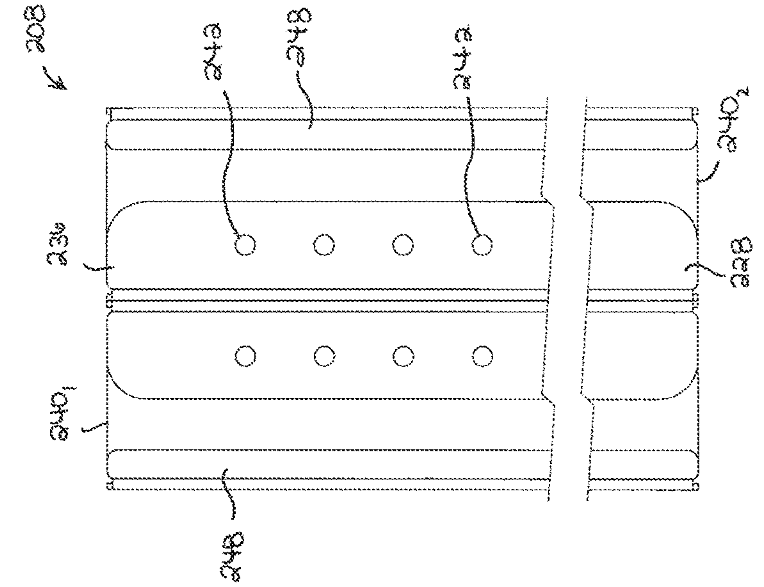
FIG. 4E is a rear elevation view of the lower anchor of FIG. 4A.
Figure 4D:
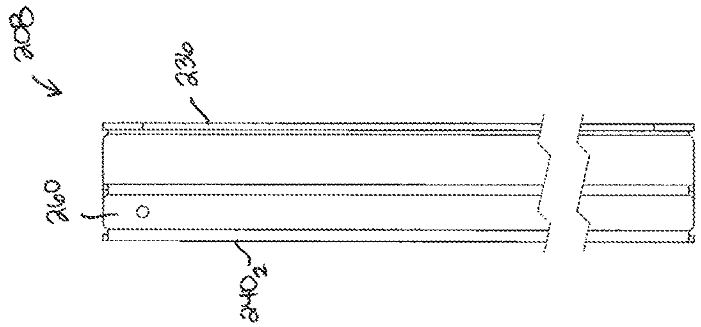
FIG. 4D is a side elevation view of the lower anchor of FIG. 4A.
Figure 4B:
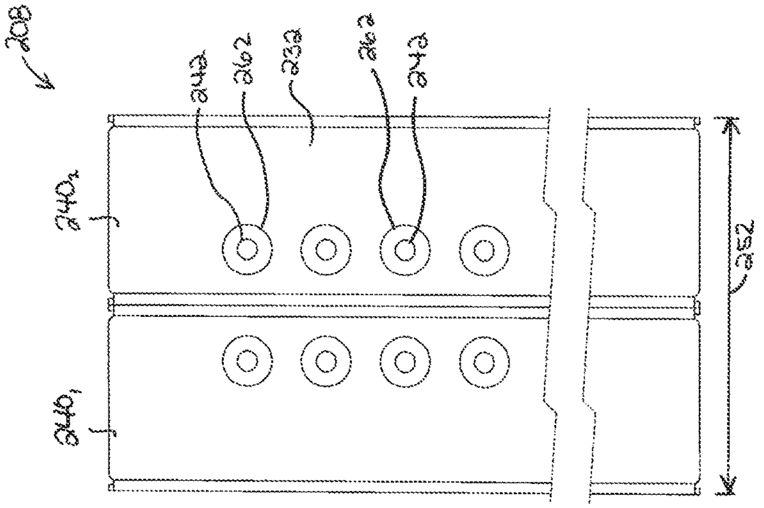
FIG. 4B is a front elevation view of the lower anchor of FIG. 4A.
Figure 4C:
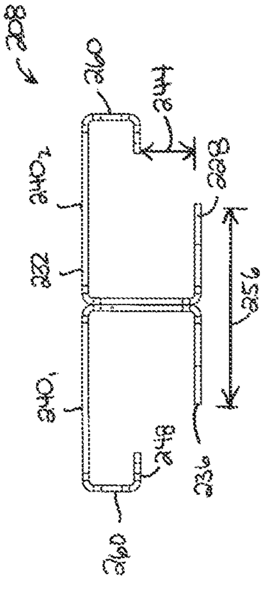
FIG. 4C is a top plan view of the lower anchor of FIG. 4A.
Figure 7:
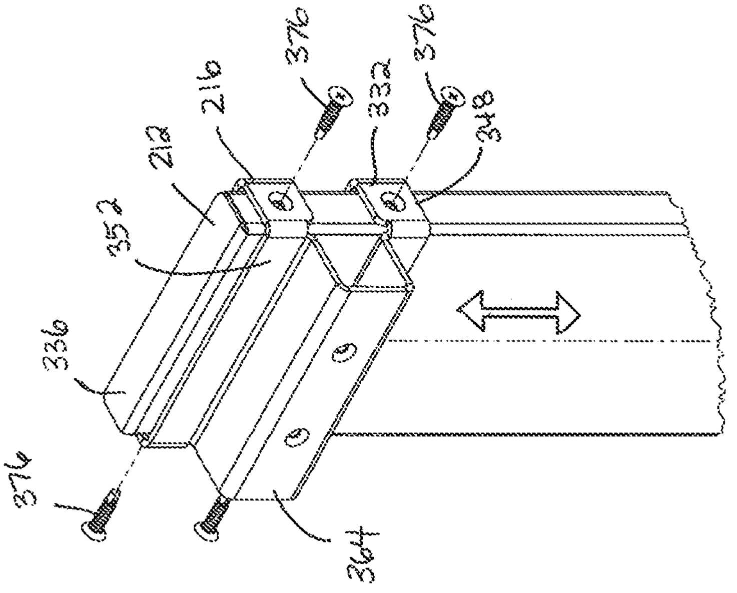
FIG. 7 is an enlargement of region 7 in FIG. 2.

Reference is now made to FIGS. 1-2, which show a spa accessory mounting assembly 200. As shown, assembly 200 includes an upper frame anchor 204, a lower anchor 208, a bridging sleeve 212, and an accessory mount 216. Upper frame anchor 204 is securable to the upper internal frame $\mathbf{136}_1$ of spa 100. Lower anchor 208 may be securable to the lower internal frame $\mathbf{136}_2$ of spa 100.

Alternatively, or in addition to securing lower anchor 208 to lower internal frame $\mathbf{136}_2$, lower anchor 208 may include a foot 220 sized to extend rearwardly under spa lower end 108. A spa may have an immense weight of 1000 lbs (450 kg) or more when filled with water. By applying such weight to foot 220, foot 220 may be effectively rigidly connected to spa 100. FIGS. 12-15, described in detail below, show an embodiment in which lower anchor 208 is not secured to a lower internal frame of the spa, and instead relies upon a foot 220 for providing a rigid connection to a spa.

Returning to FIGS. 1-2, as used herein and in the claims, "up", "down", "above", "below", "upwardly", "vertical", "elevation" and similar terms are in reference to a directionality generally aligned with (e.g. parallel to) gravity. The terms "forward", "forwardly" and similar terms are in reference to a directionality that is generally transverse (e.g. perpendicular) to gravity and directed away from spa 100. Accordingly, the terms "rear", "rearwardly" and similar terms are in reference to a directionality that is generally transverse (e.g. perpendicular) to gravity and directed towards spa 100. However, none of the terms referred to in this paragraph imply any particular alignment between elements. For example, a first element may be said to be "vertically above" a second element, where the first element is at a higher elevation than the second element, and irrespective of whether the first element is vertically aligned with the second element.

In use, upper and lower anchors 204 and 208 are discrete components that are vertically spaced apart and vertically aligned when secured to spa 100. Once anchors 204 and 208 are installed, bridging sleeve 212 overlies both the upper and lower anchors 204 and 208, bridging the vertical gap 224 between them. Accessory mount 216 may slideably connect to bridging sleeve 212 so that it can be moved to the height required by the spa accessory 132 being mounted to spa 100.

In one aspect, the design of spa accessory mounting assembly 200 may accommodate spas 100 of varying heights and framing configurations, without having to make modifications to the spa 100 (e.g. without having to install additional internal framing). For example, the provision of two discrete anchors 204 and 208 allows an anchor gap 224 between them to be selected based on the elevation difference between the upper and lower internal frames $\mathbf{136}_1$ and $\mathbf{136}_2$ or based on an elevation of upper internal frame $\mathbf{136}_1$ above spa lower end 108 (e.g. in the case of lower anchor 208 including a foot 220). Bridging sleeve 212 overlies both the upper and lower anchors 204 and 208, bridging the anchor gap 224, whereby accessory mount 216 can be positioned at any required elevation, including elevations aligned with the gap between the upper and lower anchors 204 and 208.

As used herein and in the claims, a first element is said to 'overlie' a second element based on the position and alignment of the first element relative to the second element. For example, a first element may be said to overlie a second element where the first element is positioned forward of a front end of the second element in forward alignment with the front end. Similarly, a first element may be said to overlie a second element where the first element is positioned above an upper end of the second element in vertical alignment with the upper end. Accordingly, the term 'overlying' is not strictly limited to describing an element that is located above and vertically aligned with a second element, but may also refer to position and alignment in other directionalities based on the character of the second element.

Reference is now made to FIGS. 3A-D, which show an upper frame anchor 204 in accordance with an embodiment. Upper frame anchor 204 may have any configuration suitable for mounting to an upper internal frame of a spa from an exterior of the spa, and for accommodating a connection to a bridging sleeve. As shown, upper frame anchor 204 may include a spa-facing rear side 228, an outward facing front side 232, a spa mounting portion 236, and one or more sleeve engaging portions 240. Rear spa mounting portion 236 may be coupled to an upper internal frame of the spa in any manner that provides a rigid connection thereto. For example, rear spa mounting portion 236 may be connected to upper internal frame $\mathbf{136}_1$ (FIG. 1) by a fastener (e.g. bolts, rivets, or screws). Preferably, rear spa mounting portion 236 can be connected to upper internal frame $\mathbf{136}_1$ from an exterior of spa side wall panel 120 (FIG. 1) and in a manner that does not require the installer to have access behind side wall panel 120 (FIG. 1). This may be the case with fasteners, such as screw and rivets. As shown, rear spa mounting portion 236 may have a plurality of fastener apertures 242 size to receive, e.g. the shank of a fastener. In the example of FIG. 1, upper frame anchor 204 is shown fastened to upper internal frame $136_1$ with upper frame anchor rear side 228 (FIG. 3C) in flush physical contact with spa side wall panel 120.

Referring again to FIGS. 3A-3D, a front sleeve engaging portion 240 can have any configuration suitable to accommodate a connection to bridging sleeve 212 (FIG. 2). As shown, each sleeve engaging portion 240 is positioned forward of rear spa mounting portion 236. For example, a securement gap 244 may be provided rearward of front sleeve engaging portion 240 (e.g. bounded by sleeve engaging portion 240 and spa mounting portion 236) for receiving a portion of bridging sleeve 212 (FIG. 2). This can allow bridging sleeve 212 (FIG. 2) to engage with spa facing rear face(s) 248 of sleeve engaging portion 240, whereby the sleeve engaging portion 240 can exert a rearward reactionary force upon bridging sleeve 212 (FIG. 2) to resist the bridging sleeve 212 (FIG. 2) pulling away from spa 100 in a forward direction.

In the illustrated example, upper frame anchor 204 has first and second front sleeve engaging portions $240_1$ and $240_2$ arranged horizontally side-by-side. This may provide a symmetry that allows for a balanced connection between front sleeve engaging portion 240 and bridging sleeve 212 (FIG. 2), which may reduce torsional forces. First and second sleeve engaging portions 240 may be discrete elements that are spaced apart or connected together (e.g. by welds or fastener(s)), or may be integrally formed with each other.

As shown, each sleeve engaging portion 240 may extend laterally outwardly of spa mounting portion 236. In one aspect, this may provide for a relatively wider sleeve engaging portion 240, which may enhance the strength and stability of the connection between sleeve engaging portion 240 and bridging sleeve 212. In another aspect, this may permit spa mounting portion 236 to hide behind sleeve engaging portion 240, and thereby provide mounting assembly 200 (FIG. 2) with a narrower profile that has less impact on the visual appearance of the spa 100 (FIG. 1) to which it is connected.

In alternative embodiments, sleeve engaging portions 240 do not extend laterally outboard of spa mounting portion 236. For example, sleeve engaging portion 240 may collectively have the same lateral width 252 as a lateral width 256 of spa mounting portion 236, or lateral width 252 may be less than lateral width 256. This may provide upper frame anchor rear side 228 with a relatively greater surface area to better distribute compressive loads over spa side wall panel 120. This may be particularly advantageous for applications involving particularly heavy spa accessories and/or particularly weak spa side wall panels.

As an example that may be suitable for mounting spa cover lifter 132 (FIG. 1) to spa 100 (FIG. 1), lateral width 252 may be between 2.5 inches and 10 inches, such as for example between 4 inches and 7 inches. Alternatively or in addition, lateral width 256 may be between 1 inch and 10 inches, such as for example, between 1 inch to 5 inches.

Still referring to FIGS. 3A-3D, whether there are one or many sleeve engaging portions 240, a sleeve engaging portion 240 may define a vertically extending track 260 that the bridging sleeve 212 (FIG. 2) can ride when bridging sleeve 212 is being mounted to upper frame anchor 204. This can allow bridging sleeve 212 to slide vertically into a position overlaying the upper and lower anchors 204 and 208. In turn, a sliding connection can allow bridging sleeve 212 to overlay anchors 204 and 208 that have a wide range of vertical anchor gaps 224. In the illustrated example, there are two sleeve engaging portions $240_1$ and $240_2$, each of which includes a track 260. Further description of how the bridging sleeve 212 mounts to the upper and lower anchors 204 and 208 is provided after the description of the lower anchor 208, below.

In some embodiments, sleeve engaging portion(s) 240 may overlie the spa mounting portion 236. For example, a sleeve engaging portion 240 may overlie one or more fastener apertures 242 of spa mounting portion 236. Depending on the type of fastener, this may make activating (e.g. tightening) the associated fastener difficult when securing spa mounting portion 236 to upper internal frame $136_1$. In the illustrated example, each sleeve engaging portion 240 is shown including one or more access openings 262 (e.g. apertures), each of which is aligned with (e.g. overlays) a fastener aperture 242 in spa mounting portion 236. This can allow access to the associated fastener by an installation tool (e.g. screw bit) which extends through the access opening 262.

Reference is now made to FIGS. 4A-4E, which show a lower anchor 208 in accordance with an embodiment, and in which like part numbers refer to like parts in the previous figures. In particular, lower anchor 208 may have a configuration very similar to upper frame anchor 204. For brevity and clarity of illustration, the same part numbers are used with lower anchor 208 as with upper anchor 204 in previous figures, to denote that the corresponding description of the part previously provided applies mutatis mutandis to lower anchor 208. It will be clear that in embodiments in which lower anchor 208 fastens to spa internal framing 124, the previous description when applied to lower anchor 208 is modified to refer to lower internal frame 1362 in place of upper internal frame $136_1$. Other possible differences between upper and lower anchors 204 and 208 are described below. As shown, lower frame anchor 208 may include a frame rear side 22, a frame front side 232, a spa mounting portion 236, and sleeve engaging portion(s) 240.

Figure 5:
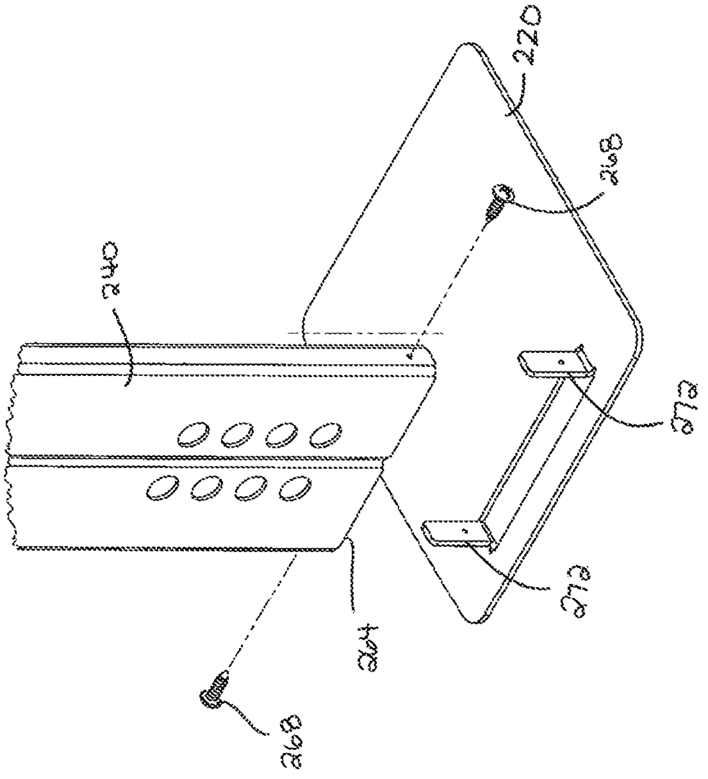
FIG. 5 is an enlargement of region 5 in FIG. 2.

As an alternative to spa mounting portion 236, or in addition to spa mounting portion 236, lower anchor 208 may include a foot. Referring to FIGS. 1 and 5, lower anchor foot 220 may be located at a lower end 264 of lower anchor 208. In use, foot 220 may extend beneath spa 100, such that the immense weight of spa 100 (particularly when filled with water) may immobilize the lower anchor relative to spa 100. This may effectively form a rigid connection between foot 220 and spa 100. As shown, sleeve engaging portion 240 (and spa mounting portion if present) may extend upwardly from (e.g. perpendicular to) foot 220. Foot 220 may be connected to sleeve engaging portion 240 in any manner, such as by integrally forming foot 220 with sleeve engaging portion 240, or attaching foot 220 to sleeve engaging portion 240 by welds or fasteners 268 (e.g. screws as shown, bolts, or rivets). As shown, foot 220 may include one or more upstanding mounting tabs 272 that overlap with sleeve engaging portion 240, and fastener(s) 268 may rigidly connect the overlapping tab(s) 272 and sleeve engaging portion 240.

Turning to FIGS. 1-2, in the illustrated embodiment, lower anchor 208 includes both a foot 220 and a spa mounting portion 236. In some cases, spa mounting portion 236 may simply act as a spacer between sleeve engaging portion 240 and spa side wall panel 120 for consistency with upper anchor 204. In other cases, spa mounting portion 236 may be connected to lower internal frame $136_2$, which may make the connection of lower anchor 208 to spa 100 more robust, particularly against torsional forces that may act to rotate or bend bridging sleeve 212 relative to foot 220 away from spa 100. Furthermore, by providing both foot 220 and spa mounting portion 236, mounting assembly 200 may be compatible with a broader array of spas 100, which may have various designs for spa lower end 108 and framing 124.

Figure 6:
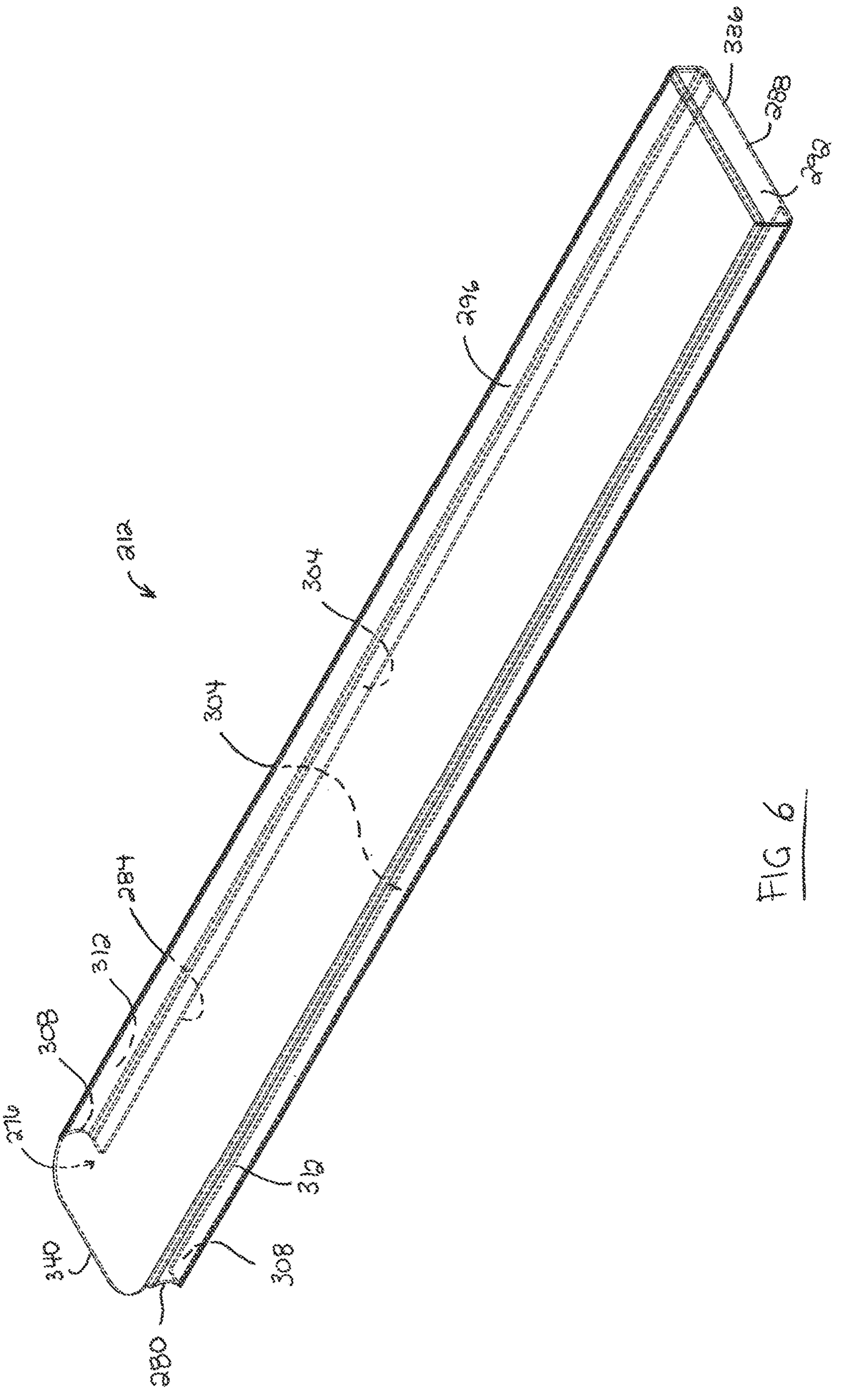
FIG. 6 is a perspective view of a bridging sleeve of the spa accessory mounting assembly of FIG. 2.

Referring now to FIGS. 2 and 6, bridging sleeve 212 can have any configuration suitable to overlay the upper and lower anchors 204 and 208, and bridge the anchor gap 224 between them when anchors 204 and 208 are mounted to spa 100 (FIG. 1). In some embodiments, bridging sleeve 212 may slideably overlay the upper and lower anchors 204 and 208. As shown, bridging sleeve 212 may mount to the upper and lower anchors 204 and 208 by sliding downwardly over the anchors 204 and 208. In the illustrated example, bridging sleeve 212 defines a vertical anchor slot (e.g. cavity) 276 that is sized to receive both the upper and lower frame anchors 204 and 208 (e.g. receive the sleeve engaging portions 240 of anchors 204 and 208) when anchors 204 and 208 are spaced apart by a vertical anchor gap 224. For example, anchor slot 276 may have an open lower end 280 that may provide an entry into anchor slot 276 for sleeve engaging portions 240 when mounting bridging sleeve 212 to anchors 204 and 208. The illustrated example also shows anchor slot 276 having a rear opening 284 that extends upwardly from vertical slot lower end 280 towards (e.g. to) slot upper end 288. Rear opening 284 may be sized to accommodate (i.e. allow passage of) spa mounting portions 236 of anchors 204 and 208.

Still referring to FIGS. 2 and 6, bridging sleeve 212 may engage rearward facing faces of upper and/or lower anchors 204 and 208. This allows frame anchor(s) 204 and/or 208 to exert a rearward reactionary force upon bridging sleeve 212 to mitigate any tendency of bridging sleeve 212 to pull forwardly away from spa 100 (FIG. 1). In some embodiments, anchor slot 276 may receive the vertically extending tracks 260 of anchor(s) 240 and/or 208. This may substantially constrain bridging sleeve 212 to vertical movement (e.g. constrained to slide along tracks 260) when overlying the upper and lower frame anchors 204 and 208. As used herein and in the claims, the expression "substantially constrain" allows for some minor play (e.g. wiggle) in other directions as well.

As shown, bridging sleeve 212 may include an upper wall 292, which may define anchor slot upper end 288. Upper wall 292 may bound (e.g. overlie or close) some or all of anchor slot upper end 288. In use, upper wall 292 may seat atop upper frame anchor 204 to inhibit further downward movement of bridging sleeve 212. This may prevent bridging sleeve 212 from sliding downwardly past and out of engagement with upper frame anchor 204. Alternatively or in addition to upper wall 292, other travel limiting members or means may be provided limit the downward movement of bridging sleeve 212.

In some embodiments, bridging sleeve 212 may define an anchor slot 276 that is bounded by a sleeve front wall 296, and at least one sleeve rear wall 304. Rear wall(s) 304 may engage anchor(s) 204 and/or 208 received in vertical slot 276 to inhibit bridging sleeve 212 from pulling away from spa 100 (FIG. 1). As shown, bridging sleeve 212 may include two laterally spaced apart, vertically extending C-channels 308. Each C-channel 308 may be defined, at least in part, by sleeve front wall 296, a respective sleeve lateral wall 312, and a respective sleeve rear wall 304. C-channels 308 may bound anchor slot 276 and interact with anchor(s) 204 and/or 208 to inhibit movement of bridging sleeve 212 in one or more (or all) non-vertical directions (e.g. forward, rearward, and lateral directions). This may constrain bridging sleeve 212 to vertical movement (e.g. to upward movement for the purpose of unmounting bridging sleeve 212 from anchors 204 and 208).

Referring to FIGS. 1-2, bridging sleeve 212 may have any height 316 relative to upper anchor height 320 and lower anchor height 324. As shown, bridging sleeve 212 may have a height that allows bridging sleeve 212 to overlap (i.e. overlie) both anchors 204 and 208 when spaced apart by a range of anchor gaps 224. In some embodiments, bridging sleeve height 316 may be greater than each of anchor height 320 and anchor height 324. For example, bridging sleeve height 316 may be greater than anchor heights 320 and 324 combined.

It will be appreciated that a relatively tall lower anchor height 324 may allow for a correspondingly wide range of anchor gaps 224. As anchor gap 224 increases (e.g. to accommodate a taller spa 100), the overlap 328 between lower anchor 208 and bridging sleeve 212 may be reduced accordingly. As shown, bridging sleeve height 316 may be 1.25 to 4 times the lower anchor height 324. For example, bridging sleeve height 316 may be between 20 inches and 60 inches (e.g. between 25 inches to 40 inches), and lower anchor height 324 may be between 15 inches and 40 inches (e.g. between 20 inches to 35 inches). These height ranges may allow mounting assembly 200 to accommodate many, most, or all common spa sizes.

Referring to FIGS. 7 and 8A-D, accessory mount 216 can have any configuration suitable to provide a position adjustable connection to bridging sleeve 212, and to provide connectivity or integration with a spa accessory. By providing accessory mount 216 with a position adjustable connection to bridging sleeve 212, a spa accessory 132 (FIG. 1) may be fastenable at the elevation it requires to operate properly, even if that elevation is located between the upper and lower internal frames 136 (FIG. 2), or in the anchor gap 224 (FIG. 2) between the upper and lower anchors 204 and 208.

As shown, spa accessory mount 216 may include a sleeve engaging portion 332 that attaches to bridging sleeve 212. In some embodiments, sleeve engaging portion 332 may be slideably connectable to bridging sleeve 212 whereby accessory mount 216 can slide vertically along bridging sleeve 212 between bridging sleeve upper and lower ends 336 and 340 (FIG. 2). For example, sleeve engaging portion 332 may define a vertical sleeve slot 344 sized to receive bridging sleeve 212. As shown, sleeve engaging portion 332 may include one or more vertically extending C-channels 348 that border sleeve slot 344. Each C-channel 348 may be defined, at least in part by, a front wall 352, a lateral side wall 356, and a rear wall 360. The front, side, and rear walls 352, 356, and 360 may collectively interact with the bridging sleeve 212 to restrict (i.e. constrain) accessory mount 216 to vertical movement along bridging sleeve 212.

Once sleeve engaging portion 332 is moved to a targeted position on bridging sleeve 212, sleeve engaging portion 332 may be locked into position (i.e. rigidly connected to bridging sleeve 212) in any manner. For example, sleeve engaging portion 332 may be rigidly connected to bridging sleeve 212 by welds, or by fasteners 376 (e.g. screws as shown, bolts, or rivets).

Figure 8A:
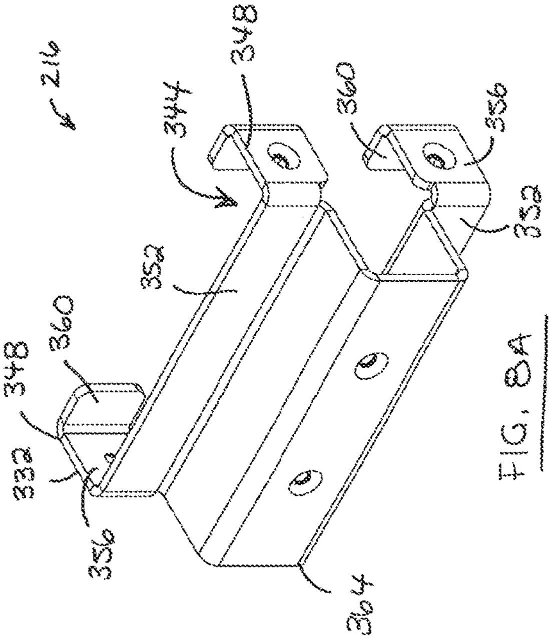
FIG. 8A is a perspective view of an accessory mount of the spa accessory mounting assembly of FIG. 2.
Figure 8B:
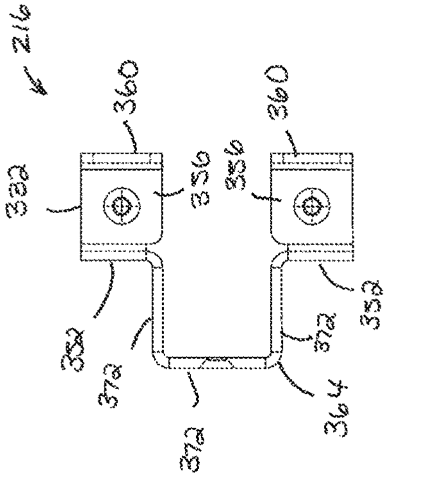
FIG. 8B is a side elevation view of the accessory mount of FIG. 8A.
Figure 8D:
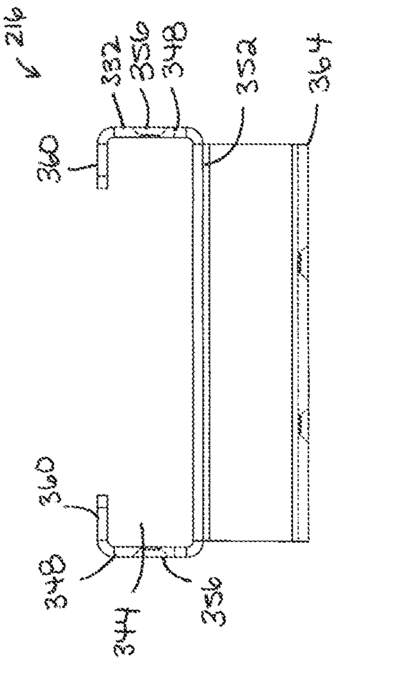
FIG. 8D is a top plan view of the accessory mount of FIG. 8A.
Figure 8C:
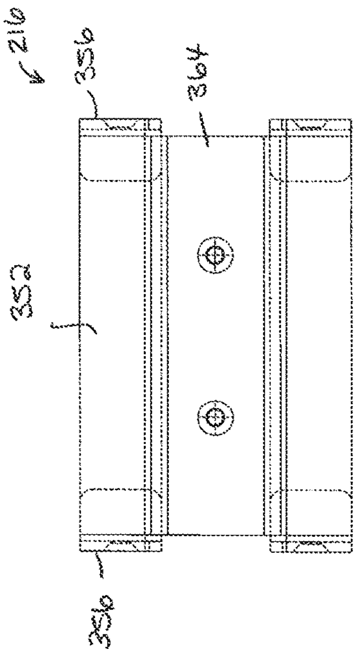
FIG. 8C is a front elevation view of the accessory mount of FIG. 8A.

Still referring to FIGS. 7 and 8A-D, the illustrated example includes an accessory engaging portion 364. As shown, accessory engaging portion 364 may extend forwards of the sleeve engaging portion 332. Accessory engaging portion 364 may have any configuration suitable for attachment with a spa accessory. As shown in FIG. 1, accessory engaging portion may include a spa cover lifter mounting bracket 368. In the illustrated embodiment, bracket 368 includes a horizontal mounting channel defined by a plurality of connected horizontally extending sidewalls 372 (FIG. 8B, e.g. a rectangular cross-section tube).

Figure 9:
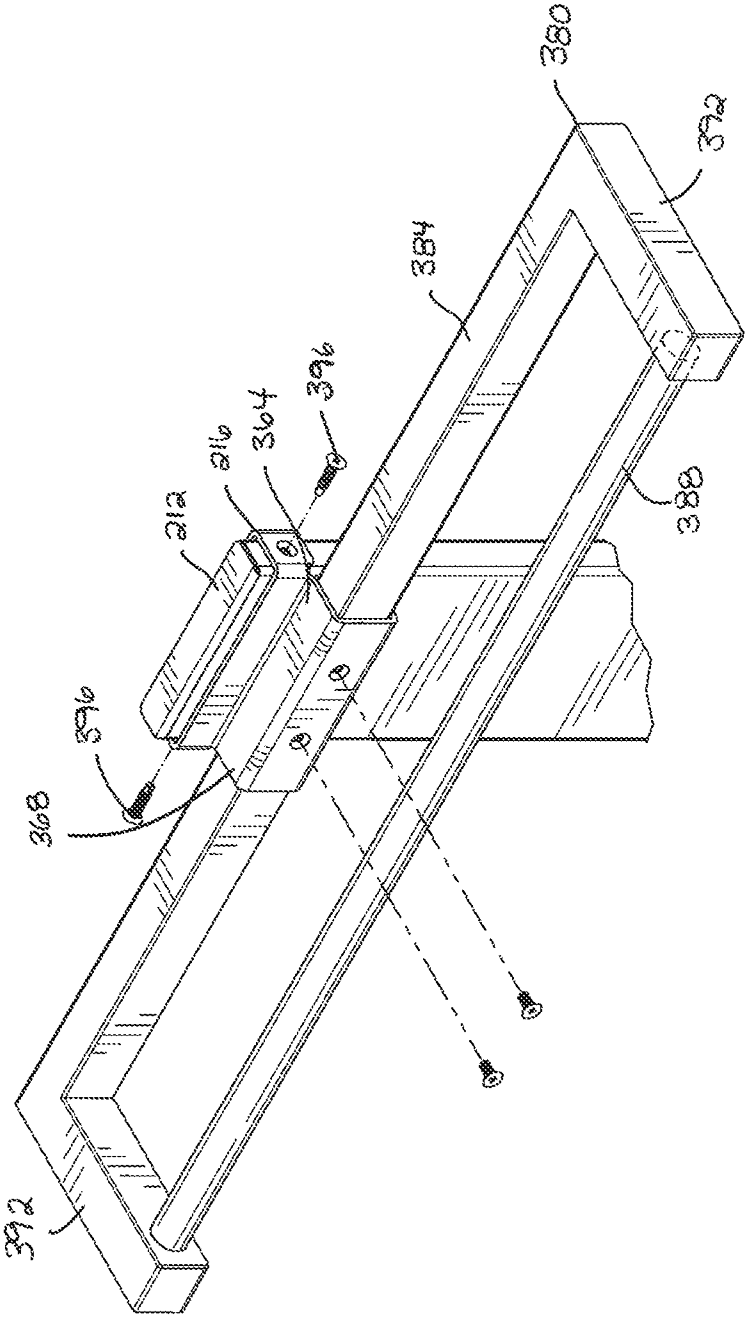
FIG. 9 is a partial exploded perspective view of a spa accessory mounting assembly and a towel rack mounted thereto, in accordance with an embodiment.

In other embodiments, bracket 368 may have another configuration compatible with a particular spa accessory, such as cover lifter 132 (FIG. 1) or another spa accessory. FIG. 9 shows an embodiment in which accessory engaging portion 364 includes a mounting bracket 368 for a spa accessory that is a towel rack 380. This can provide users of spa 100 (FIG. 1) with easy access to towels, and avoids users having to lay their towels over the spa side wall where they can fall into the water or onto the ground. As shown, towel rack 380 may include a rear cross-bar 384, a front towel dowel 388 spaced forward of rear cross-bar 384, and side arms 392 that connect front towel dowel 388 to rear cross-bar 384. As shown, rear cross-bar 384 may be received in, or otherwise connected to, mounting bracket 368, and optionally locked in position by one or more fasteners 396.

Figure 10:
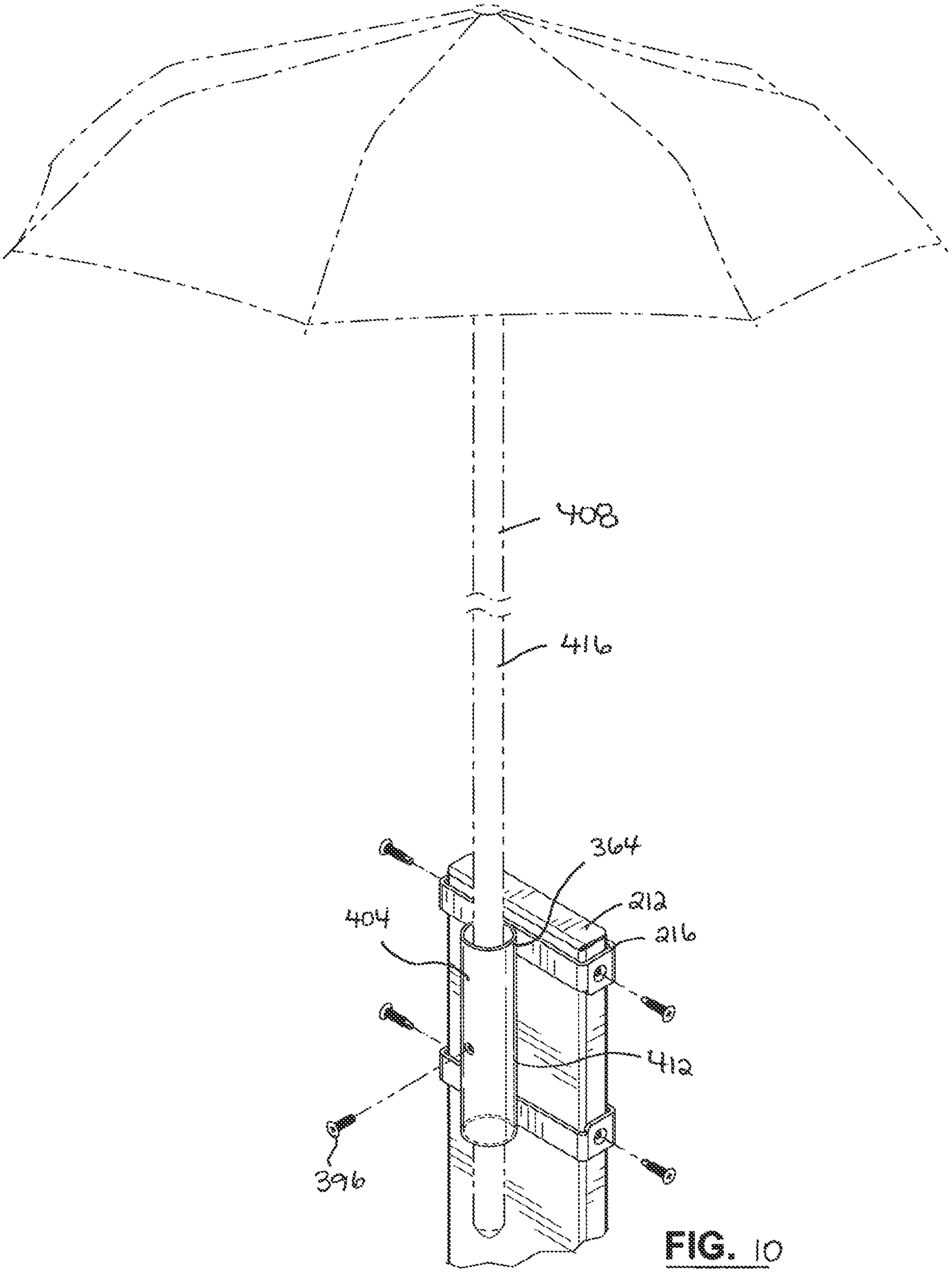
FIG. 10 is a partial exploded perspective view of a spa accessory mounting assembly and an umbrella mounted thereto, in accordance with an embodiment.

Reference is now made to FIG. 10, in which accessory engaging portion 364 includes an umbrella mount 404. This allows an umbrella to be supported where it can provide cover to users of the spa against sun or rain. Umbrella mount 404 can have any structure suitable to hold an umbrella 408. In the illustrated example, umbrella mount 404 includes an upwardly extending channel 412 (e.g. vertical as shown, or at an angle to vertical), which is sized to hold the shaft 416 of umbrella 408. Optionally, a fastener 396 may be provided to rigidly join a mounted umbrella 408 to accessory engaging portion 364.

Figure 11:
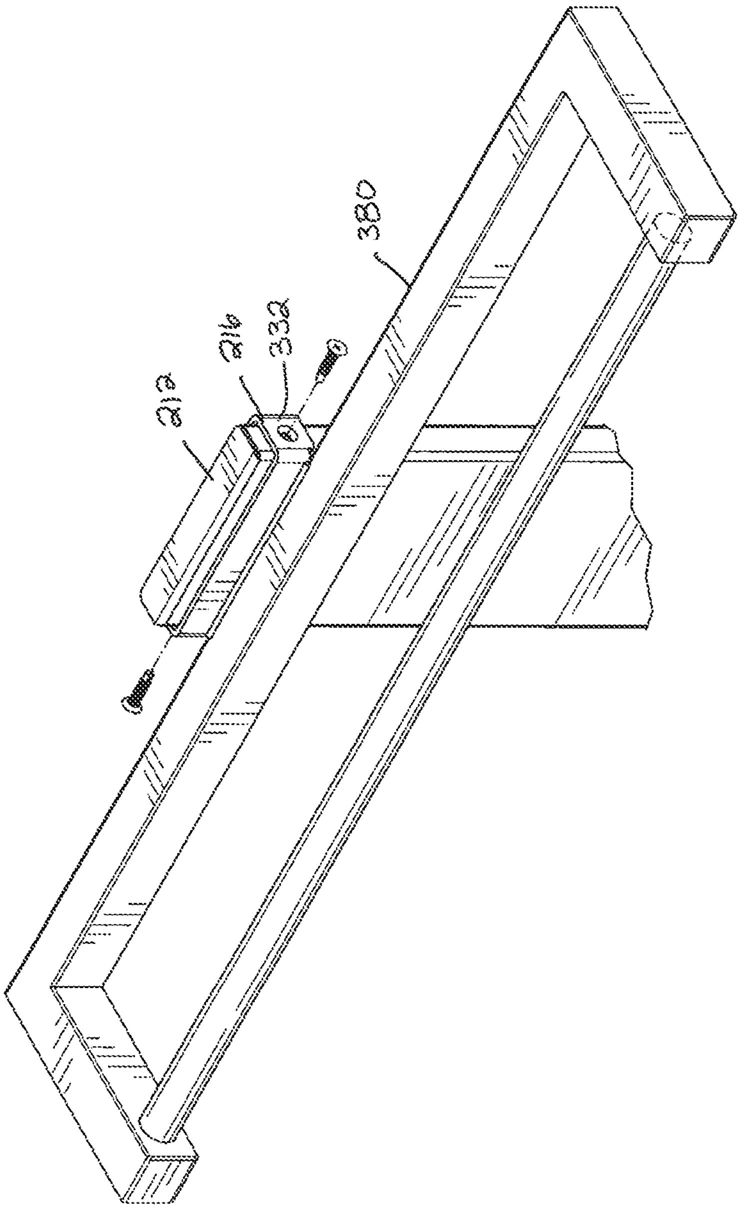
FIG. 11 is a partial exploded perspective view of a spa accessory mounting assembly having an accessory mount that includes a towel rack.

Reference is now made to FIG. 11. In some embodiments, accessory mount 216 includes a spa accessory 380 (e.g. cover lifter, towel rack, or umbrella) instead of, or in addition to, an accessory engaging portion. As shown, the spa accessory 380 may extend forwardly of sleeve engaging portion 332. FIG. 11 shows an example in which the spa accessory 380 is a towel rack. The spa accessory 380 may be integrally formed, or permanently connected to sleeve engaging portion 332. As compared with an accessory engaging portion that carries the spa accessory 380, integrating the spa accessory 380 into the accessory mount 216 may provide greater rigidity, albeit less flexibility to mount other spa accessories 380. For example, in the case of an umbrella, an integrated umbrella may be better able to withstand strong winds without detaching from or causing damage to accessory mount 216.

Reference is now made to FIGS. 12-15, which shows a spa accessory mounting assembly 200 in accordance with another embodiment. As shown, assembly 200 may include a lower anchor 208 having a horizontal foot 220, an upright support 424 connected to lower anchor 208, and an accessory mount 216 connected to upright support 424.

The illustrated embodiment may permit spa accessory mounting assembly 200 to be mounted to a spa 100 without any fasteners connecting assembly 200 to the spa. Instead, the weight of spa 100 (particularly when filled with water) on foot 220 may effectively provide a rigid connection between assembly 200 and the spa, and upright support 424 may be freestanding above lower anchor 208 (e.g. no use of destructive fasteners or destructive fastening techniques). This allows mounting assembly 200 to be used in connection with a spa 100, without a user having to drill holes in their spa. This design may eliminate user's concerns with drilled holes damaging their spa, which may have cost many thousands of dollars. This design may also eliminate user's anxiety over drilling holes into their spa in the wrong location, which may be expensive to repair. Moreover, this design may allow assembly 200 to be used with spas in which the sidewall panels or internal framing are not suitable for supporting an accessory mounting assembly.

Foot 220 may have any configuration suitable to bear the weight of a spa and to thereby effectively provide a rigid connection with the spa. For example, foot 220 may be formed as a planar element, such as a thin plate. Preferably, foot 220 does not interfere with the stable positioning of the spa on a ground surface. For example, foot 220 is preferably sized so as not to substantially (or at all) tilt the spa away from the ground surface. In some embodiments, foot 220 has a thickness 480 of less than 1 inch, such as between 0.03 and 0.5 inches.

As shown, foot 220 may extend rearwardly of upright support 424. This allows foot 220 to extend under a spa 100 while upright support 424 abuts the spa sidewall. Foot 220 may extend rearwardly by a distance 484 suitable for receiving sufficient weight from the spa to form a rigid connection. For example, foot 220 may extend rearwardly of upright support 424 by a distance 484 of at least 5 inches (e.g. 5 to 50 inches).

As shown, spa accessory mounting assembly 200 may be free of fastener apertures positioned to accommodate fasteners that would penetrate a spa (e.g. penetrate a spa sidewall panel). For example, neither lower anchor 208 nor upright support 424 may include a fastener aperture in a rear wall thereof.

Optionally, spa accessory mounting assembly 200 may include one or more non-destructive (e.g. non-penetrating) fasteners 492 to provide some transverse stability (e.g. in the forward/rearward direction). Fastener(s) 492 may help prevent mounting assembly 200 moving forwardly away from spa (e.g. away from spa sidewall). However, fastener(s) 492 provide no meaningful load bearing (e.g. in the vertical and side directions) for supporting a connected spa accessory (e.g. cover lifter and cover). Fastener(s) 492 may include adhesive, hook-and-loop panels as shown, or magnetic panels. In the illustrated example, hook-and-loop panels 492 include one panel $492_1$ adhesively connected to mounting assembly 200 (e.g. to upright support 424), and one panel $492_2$ adhesively connected to the spa (e.g. to the spa sidewall). Panels $492_1$ and $492_2$ have mating hooks and loops, or similar, that when moved together resist separation. In other embodiments, spa accessory mounting assembly 200 does not include fasteners 492.

In alternative embodiments, spa accessory mounting assembly 200 may include one or more fastener apertures (e.g. such as fastener apertures 242, FIG. 3D) positioned to accommodate destructive fasteners (e.g. that would penetrate a spa, such as penetrating a spa sidewall). This would allow a user the option to use a fastener to reinforce the connection between the spa accessory mounting assembly 200 and the spa. For example, this may improve the rigidity of the connection between spa accessory mounting assembly 200 and the spa, particularly where the spa is empty of water, all else being equal.

Upright support 424 may be movable relative to lower anchor 208 between two or more elevations, and rigidly connectable to lower anchor 208 at each of the elevations. Alternatively or in addition, accessory mount 216 may be movable relative to upright support 424 between at least two elevations, and rigidly connectable to upright support 424 at each of the elevations. By allowing one or both of upright support 424 and accessory mount 216 to be rigidly connectable at different elevations, respectively, spa accessory mounting assembly 200 may be adaptable to many different configurations of spa (e.g. spas of many different makes and models). This can reduce the cost and complexity of manufacturing a great number of SKUs for providing compatibility with a wide range of different spas.

Still referring to FIGS. 12-15, upright support 424 may extend from lower anchor 208 in any manner. As shown, upright support 424 may extend longitudinally from a lower end 428 to an upper end 432. Upright support 424 may include a lower portion 436 including or proximate lower end 428, and an upper portion 440 including or proximate upper end 432. As shown, upper portion 440 is located above lower portion 436. When lower portion 436 is rigidly connected to lower anchor 208, upper portion 440 and/or upper end 432 extends above lower anchor 208. This allows accessory mount 216 to be rigidly connected to upright support upper portion 440.

When upright support lower portion 436 is rigidly connected to lower anchor 208, upright support 424 may extend upwardly away from lower anchor 208 (e.g. away from foot 220). For example, upright support 424 may extend substantially vertically (e.g. within 15 degrees of vertical) or exactly vertically (e.g. within 3 degrees of vertical) from upright support lower end 428 to or towards upright support upper end 432. Alternatively or in addition, upright support 424 may extend substantially perpendicular to (e.g. within 15 degrees of perpendicular) or exactly perpendicular (e.g. within 3 degrees of perpendicular) to lower anchor foot 220. By extending upwardly (e.g. vertically and/or perpendicular to foot 220), upright support 424 may extend parallel to the sidewalls of most spas to which assembly 200 is designed to be mounted. By closely conforming to the spa sidewall, the degree to which assembly 200 protrudes from the spa may be reduced, which may minimize interference by assembly 200 with the visual appearance of the spa, and the usage of space around the spa.

In alternative embodiments, upright support 424 may extend non-vertically (e.g. at an angle greater than 15 degrees of vertical) and/or non-perpendicularly to foot 220 (e.g. at an angle of greater than 15 degrees of perpendicular). This may permit upright support 424 to conform to spa bottoms and sidewalls of various irregular shapes/configurations.

Still referring to FIGS. 12-15, upright support 424 may be connected to lower anchor 208 in any manner that can provide a rigid connection. For example, upright support 424 may be permanently connected to lower anchor 208 (e.g. by welds, rivets, or integrally forming upright support 424 with lower anchor 208), or removably connected to lower anchor 208 (e.g. by removable fasteners, such as by threaded fasteners). In the illustrated embodiment, upright support 424 is movable (e.g. slideable) longitudinally (e.g. upwardly) relative to lower anchor 208 between two or more positions (e.g. elevations), and rigidly connectable to lower anchor 208 at each of the positions. This allows upright support 424 to be rigidly connected to lower anchor 208 at a lower elevation to accommodate a shorter spa, and at a higher elevation to accommodate a taller spa.

In some embodiments, lower anchor 208 and upright support 424 may have any configuration suitable to allow upright support 424 to be rigidly connected to lower anchor 208 at two or more elevations (which may be referred to as "upright support elevations"). In the illustrated example, lower anchor 208 includes an upstanding bracket 444. As shown, upstanding bracket 444 may extend in height from bracket lower end 448 to bracket upper end 452. Upright support lower portion 436 may be rigidly connected to upstanding bracket 444. Upright support lower portion 436 and upstanding bracket 444 may overlap in height when rigidly connected. For example, there may be greater degree of overlap when upright support 424 is at a lower upright support elevation than when upright support 424 is at a higher upright support elevation.

In the illustrated example, upright support lower portion 436 is received in upstanding bracket 444 when rigidly connected to upright support 424. As shown, upstanding bracket 444 may define a U-channel having a U-shaped cross-section when sectioned by a horizontal plane. In alternative embodiments, upstanding bracket 444 may define a differently shaped channel, or may have a closed cross-sectional shape (e.g. as in a pipe). In other embodiments, upstanding bracket 444 may be formed neither as a channel nor a pipe. For example, upstanding bracket 444 may include one or many spaced apart upstanding walls (e.g. similar to mounting tabs 272 of FIG. 5), which may extend externally or internally of upright support 424 when upright support 424 is rigidly connected to lower anchor 208.

As shown, upright support 424 and upstanding bracket 444 may include a plurality of fastener apertures 242, which may align at two or more upright support elevations relative to lower anchor 208. This may permit fasteners 268 (e.g. threaded fasteners, such as bolts or screws, or rivets) to be extended through aligned fastener apertures 242 to rigidly connect upright support 424 to upstanding bracket 444 at an upright support elevation selected to accommodate the dimensions of the spa and a given spa accessory.

Upstanding bracket 444 may have any height that can accommodate a rigid connection with upright support 424 at two or more elevations. In some embodiments, lower anchor 208 (or upstanding bracket 444) may have a height 456 of at least 4 inches (e.g. 4 to 24 inches). Alternatively or in addition, height 456 may be at least 15% (e.g. 15% to 50%) of upright support height 460. Such heights 456, as expressed in inches or as a percentage of upright support height 460, may be sufficient to accommodate rigid connections at a meaningfully range of upright support elevations. This may permit spa accessory mounting assembly 200 to be compatible with a wide variety of spas and spa accessories.

Optionally, upstanding bracket 444 may include lateral ribs 464. Ribs 464 may reinforce upstanding bracket 444 to provide greater torsional stability, particularly as the weight of a connected accessory (e.g. spa cover) shifts laterally of spa accessory mounting assembly 200. For example, where mounting assembly 200 is connected to a spa cover lifter 132 (e.g. a lift assembly as described in U.S. Pat. No. 9,708,823, the entirety of which is hereby incorporated by reference) and spa cover 128, moving the spa cover 128 between closed and open positions may exert torsional loads upon upstanding bracket 444, and lateral ribs 464 may help lower anchor 208 support such torsional loads without breaking.

Upright support 424 may have any configuration suitable for rigid connections with lower anchor 208 and accessory mount 216, and for supporting the load of an accessory carried by accessory mount 216 (e.g. a cover lifter and spa cover). For example, upright support 424 may be a solid or hollow member (also referred to as a "post", "strut", or "stud"). Upright support 424 may have any cross-sectional shape, such as rectangular, circular, or another regular or irregular shape. In the illustrated example, upright support 424 is formed as a rectangular, hollow member having a lateral width 468, greater than a rearward depth 472. This design may reduce the degree to which upright support 424 protrudes from a spa sidewall against which it is positioned. For example, width 468 may be 1.5 to 10 times rearward depth 472.

As shown, upright support 424 may include a rear side 476 that is substantially planar. As most spa sidewalls are planar, this design may permit upright support rear side 476 to better conform with the profile of most spa sidewalls. In alternative embodiments, rear side 476 may be substantially curved or have another profile, such as to conform with correspondingly shaped spa sidewalls.

Upright support 424 may have any height 460 suitable to accommodate a rigid connection with accessory mount 216 at an elevation (also referred to as an "accessory mount elevation") required by the accessory (e.g. cover lifter 132) carried by accessory mount 216. Further, height 460 should not be so tall as to interfere with the use of spa 100. For example, depending on the accessory being carried by accessory mount 216, height 460 may not extend above spa upper end 112 when at the lowest upright support elevation so as not to interfere with user's ingress into, egress out of, and view from spa 100. For example, upright support 424 may have a height 460 of at least 12 inches (e.g. 12-36 inches). In other cases, accessory mount 216 may have a height 460 that allows accessory mount 216 to rigidly connect to accessory mount 216 at an accessory mount elevation above spa upper end 112. For example, upright support 424 may have a height 460 of at least 24 inches (e.g. 24-60 inches).

Still referring to FIGS. 12-15, accessory mount 216 may be rigidly connected to upright support 424 in any manner that allows assembly 200 to carry a connected accessory (e.g. spa cover lifter 132). For example, accessory mount 216 may be permanently connected to upright support 424 (e.g. by welds, rivets, or integrally forming accessory mount 216 with upright support 424), or removably connected to upright support 424 (e.g. by removable fasteners, such as by threaded fasteners).

The rigid connectivity of accessory mount 216 to upright support 424, and upright support 424 to lower anchor 208 should allow an elevation of accessory mount 216 above anchor foot 220 to be selectable to accommodate the elevation required by the accessory (e.g. spa cover lifter 132) carried by accessory mount 216. In some embodiments, upright support 424 is upwardly (e.g. vertically) movable relative to lower anchor 208 between at least two elevations, and rigidly securable to lower anchor 208 at each elevation. Alternatively or in addition, accessory mount 216 may be upwardly (e.g. vertically) movable relative to upright support 424 between at least two elevations, and rigidly securable to upright support 424 at each elevation. Where both of upright support 424 and accessory mount 216 are upwardly movable between at least two respective elevations, and rigidly securable at each respective elevation, assembly 200 may provide greatest flexibility and precision in positioning a connected accessory at a required elevation relative to spa 100. For some accessories (e.g. cover lifters), the mounting elevation is critical to the proper functioning of the accessory.

Still referring to FIGS. 12-15, accessory mount 216 may be connected to upright support 424 in any manner that can provide a rigid connection. For example, accessory mount 216 may be permanently connected to upright support 424 (e.g. by welds, rivets, or integrally forming accessory mount 216 with upright support 424), or removably connected to upright support 424 (e.g. by removable fasteners, such as by threaded fasteners). In the illustrated embodiment, accessory mount 216 is movable (e.g. slideable) longitudinally (e.g. upwardly) relative to upright support 424 between two or more positions (e.g. elevations), and rigidly connectable to upright support 424 at each of the positions. This allows accessory mount 216 to be rigidly connected to upright support 424 at a lower elevation to accommodate a shorter spa, and at a high elevation to accommodate a taller spa.

In some embodiments, upright support 424 and accessory mount 216 may have any configuration suitable to allow accessory mount 216 to be rigidly connected to upright support 424 at two or more elevations (which may be referred to as "accessory mount elevations"). In the illustrated example, accessory mount 216 is positionable (e.g. movable, such as slideable) relative to upright support 424 along upright support height 460 (e.g. along upright support upper portion 440) to a plurality of elevations, and rigidly connectable to accessory mount 216 at each location. For example, accessory mount 216 may be rigidly connected to upright support 424 by fasteners 376, which may be permanent fasteners (e.g. rivets) or removable fasteners (e.g. screws or bolts).

In the illustrated example, accessory mount 216 is slideably movable along upright support 424, and rigidly connectable to upright support 424 in the same manner as described above with respect to how an upright support 424 may be movable along and rigidly connectable to a bridging sleeve in connection with other embodiments. For example, accessory mount 216 may overlay upright support 424 when moving along and/or rigidly connected to upright support 424. As shown, accessory mount 216 may include an upright support engaging portion 332 that can receive upright support upper portion 440 and slide upwardly/downwardly (e.g. vertically) along upright support height 460 to a selected accessory mount elevation, and then upright support engaging portion 332 may be rigidly connected to upright support 424 (e.g. by fasteners 376) at the selected accessory mount elevation. In the illustrated example, fasteners 376 may extend through aligned accessory mount fastener apertures 488 and upright support fastener apertures 242. Alternatively, fasteners 376 may extend through accessory mount fastener apertures 488 and bear against upright support (e.g. instead of penetrating an upright support fastener aperture). As shown, accessory engaging portion 364 may extend forwardly of upright support engaging portion 332.

Figure 12:
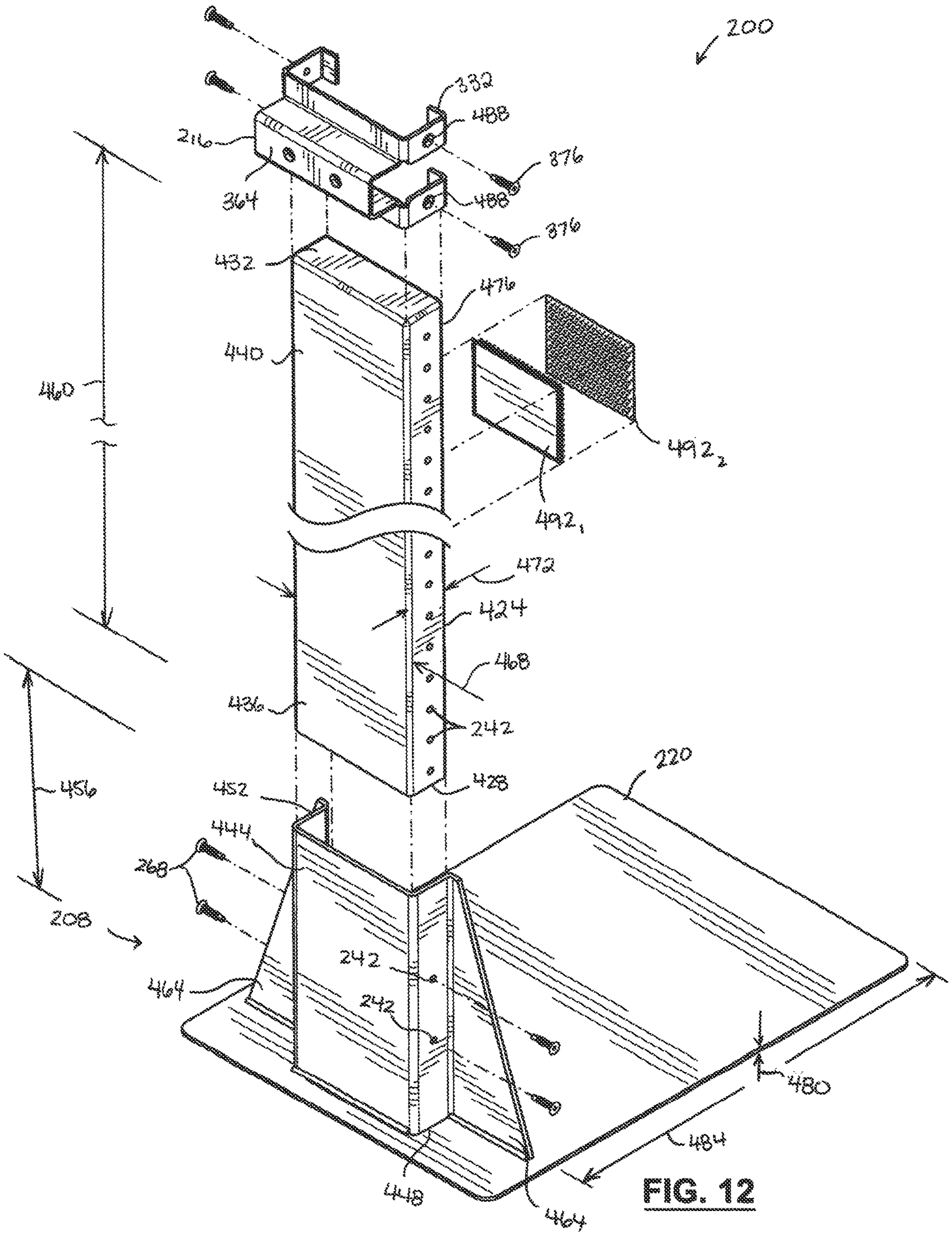
FIG. 12 is an exploded perspective view of a spa accessory mounting assembly in accordance with another embodiment.
Figure 13:
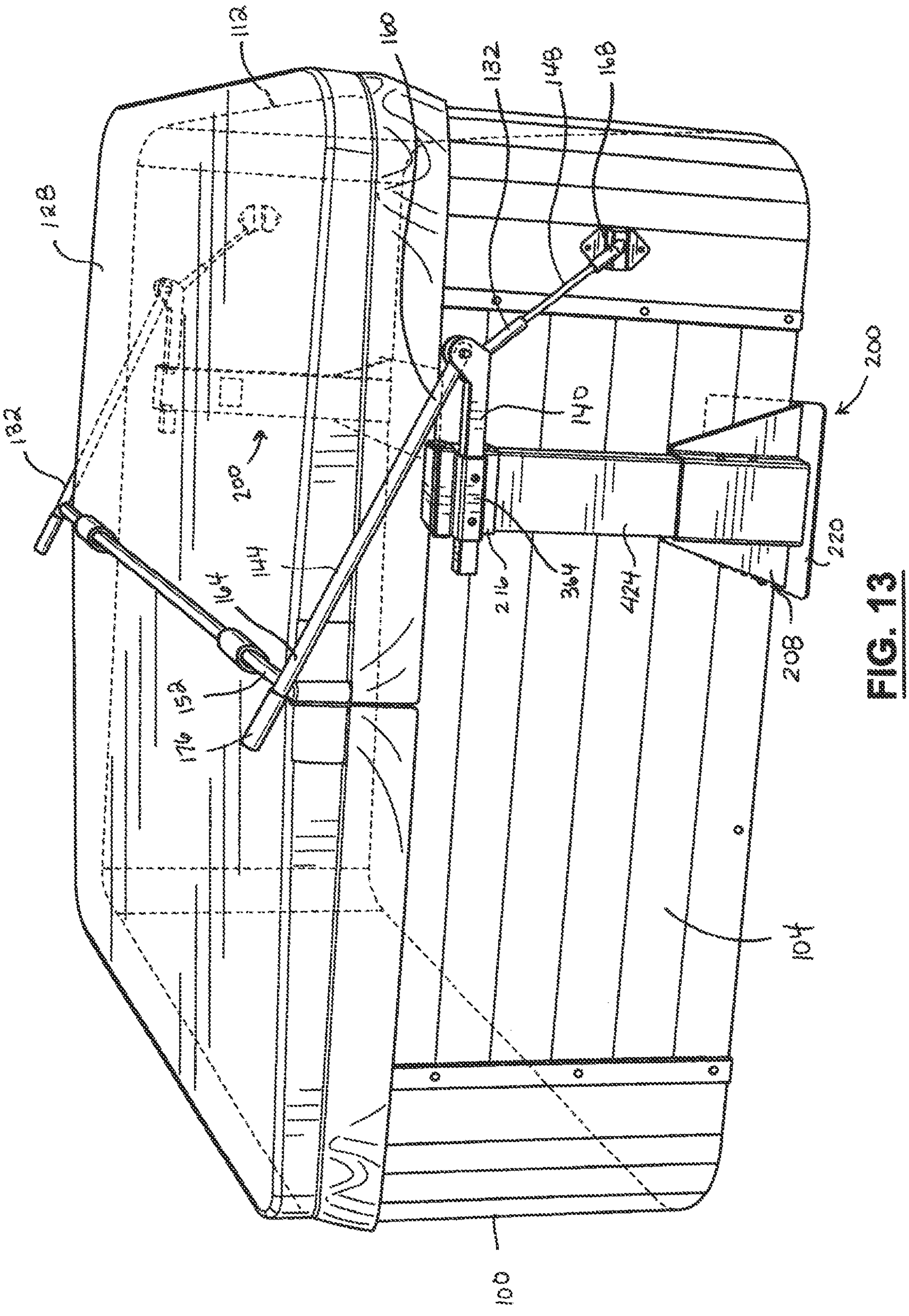
FIG. 13 is a perspective view of a spa including spa mounting accessories of FIG. 12 carrying spa cover lifters for a spa cover, with the spa cover and spa cover lifters in a closed position.
Figure 14:
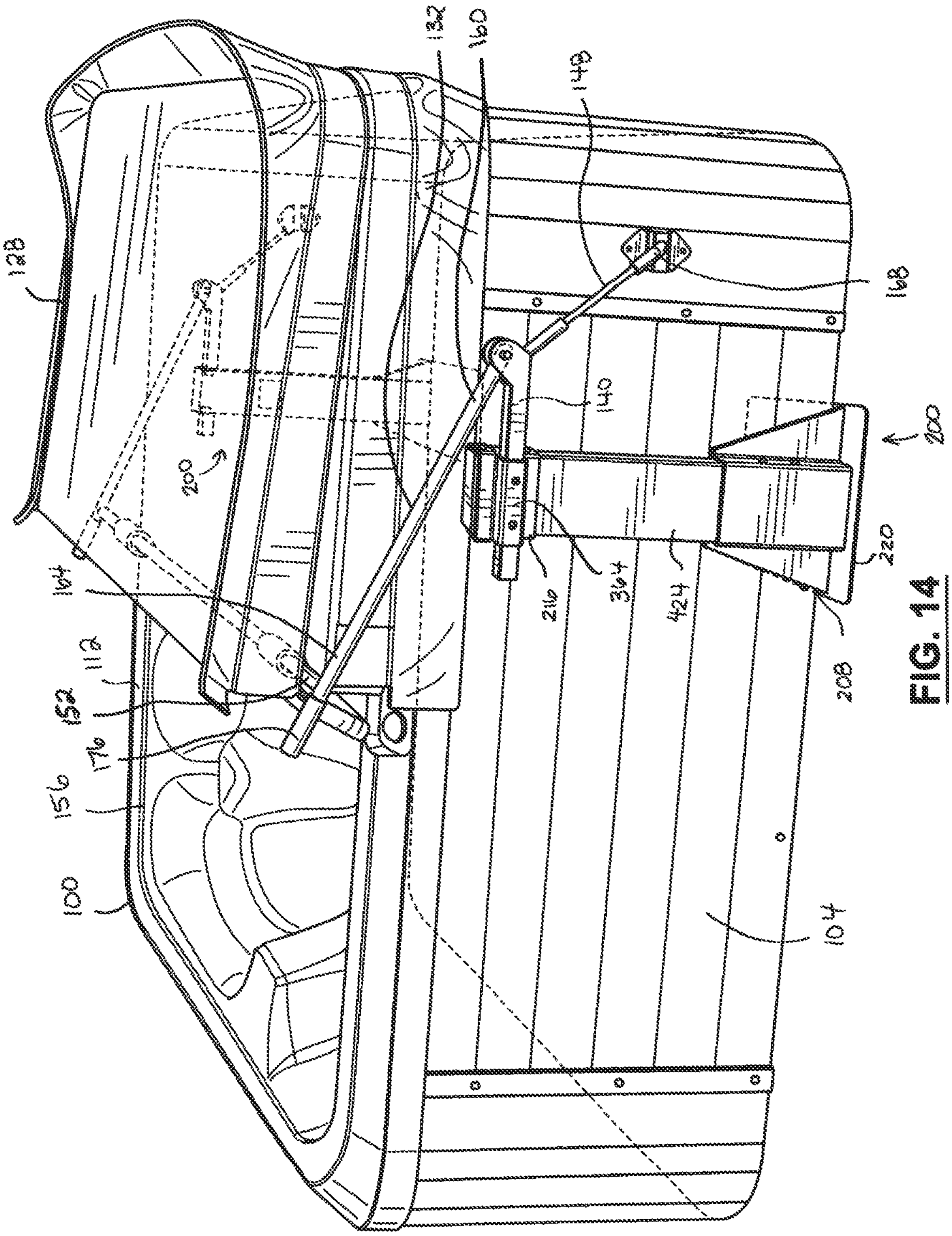
FIG. 14 is a perspective view of the spa of FIG. 13, with the spa cover in a folded position and the spa cover lifters in the closed position.
Figure 15:
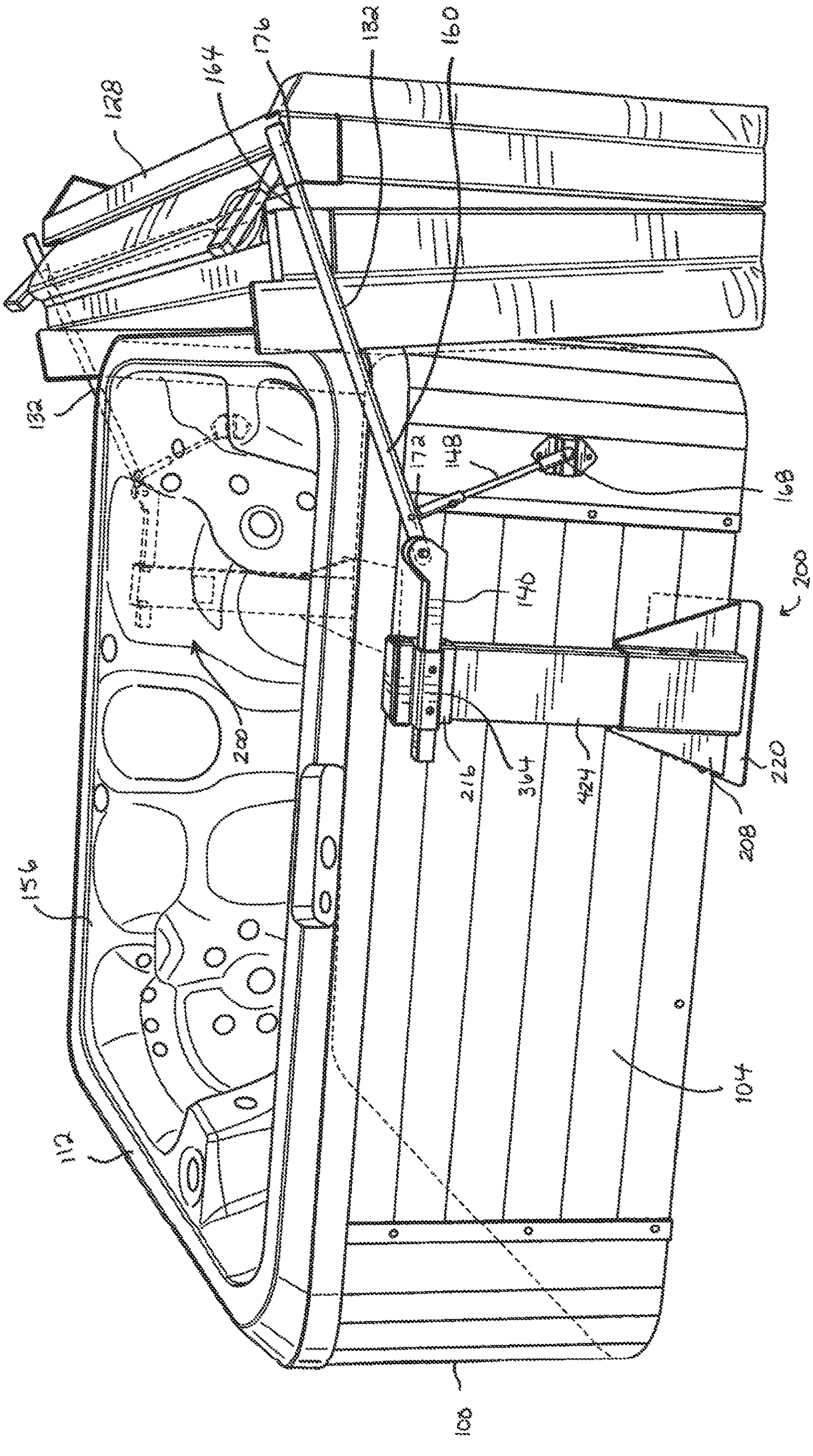
FIG. 15 is a perspective view of the spa of FIG. 13, with the spa cover and spa cover lifters in an open position.

Reference is now made to FIGS. 13-15, which show a spa 100 including two of the spa accessory mounting assembly 200 of FIG. 12, each carrying a spa cover lifter 132. As shown, lower anchor foot 220 extends below spa lower end 108, which provides a rigid connection between mounting assembly 200 and spa 100. Upright support 424 is freestanding from lower anchor 208 absent any load-bearing connection to spa 100 (e.g. to spa sidewall 104).

In the illustrated example, each cover lifter 132 includes a mounting beam 140, a lever arm 144, and a pneumatic spring 148 (e.g. gas strut). Cover lifters 132 are connected to spa cover 128 by a connecting portion 152. As shown, connecting portion 152 may extend across spa cover 128. Lever arm 144 includes a proximal portion 160 (e.g. proximal end) that is rotatably (e.g. pivotably) connected to mounting beam 140, and a distal portion 164 (e.g. distal end) that is joined to connecting portion 152. Lever arm distal portion 164 may include a handle 176 for a user to grasp when rotating lever arm 144. Pneumatic spring 148 includes a proximal end 168 rotatably (e.g. pivotably) connected to spa sidewall 104, and a distal end 172 (FIG. 15) connected to lever arm 144.

Each mounting beam 140 is connected to the accessory mount 216 (i.e. to accessory engaging portion 364) of a respective mounting assembly 200. Optionally, mounting beam 140 may be horizontally movable (e.g. slideable) relative to accessory mount 216 between at least two horizontal positions, and rigidly connectable to accessory mount 216 at each of the horizontal positions. In combination with the adjustable vertical positioning of accessory mounting assembly 216, as described in detail above, the adjustable horizontal positioning of mounting beam 140 allows the cover lifter 132 to be precisely mounted in two-dimensions (i.e. vertical and horizontal).

To open spa cover 128, i.e. to move spa cover 128 from the closed position (FIG. 13) in which spa cover 128 closes spa upper opening 156, to the open position (FIG. 15) in which spa cover 128 is clear of spa upper opening 156, spa cover 128 may be first folded over cover lifter connecting portion 152 (as seen in the transition from FIG. 13 to FIG. 14), and then cover lifter lever arm 144 may be user-rotated (e.g. by pulling handle 176) whereby the folded spa cover 128 is lifted off of spa upper opening 156 and moved laterally to one side of spa 100 (as seen in the transition from FIG. 14 to FIG. 15). Pneumatic spring 148 may exert a force upon cover lifter lever arm 144 during the lifting motion that urges lever arm 144 from the closed position towards the open position, whereby the force required by the user to lift spa cover 128 from spa upper opening 156 using lever arm 144 is lessened.

To close spa cover 128, the reverse process is followed, as illustrated in the transitions from FIG. 15 to FIG. 14 to FIG. 13. In this case, pneumatic spring 148 may exert a force upon cover lifter lever arm 144 during the lifting motion that urges lever arm 144 from the open position towards the closed position, whereby the force required by the user to lift cover 128 from spa upper opening 156 using lever arm 144 is lessened.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

ITEMS

Item 1: A spa accessory mounting assembly comprising:
an upper frame anchor securable to an upper internal frame of a spa;
a lower frame anchor securable to a lower internal frame of a spa;
a bridging sleeve sized and shaped to overlie both the upper and lower frame anchors when the upper frame anchor is spaced vertically above the lower frame anchor; and
an accessory mount connected to the bridging sleeve and positionable along a height of the bridging sleeve.

Item 2: The spa accessory mounting assembly of any preceding item, wherein
the bridging sleeve defines a vertical slot sized to receive both the upper and lower frame anchors when the upper frame anchor is spaced vertically above the lower frame anchor.

Item 3: The spa accessory mounting assembly of any preceding item, wherein
each of the upper and lower frame anchors has a spa-facing rear side and an outward-facing front side, and
the bridging sleeve engages at least the spa-facing rear sides of the upper and lower frame anchors when overlying the upper and lower frame anchors.

Item 4: The spa accessory mounting assembly of any preceding item, wherein
when the bridging sleeve is overlying the upper and lower frame anchors, the bridging sleeve is substantially constrained to vertical movement.

Item 5: The spa accessory mounting assembly of any preceding item, further comprising:
a horizontal foot, the lower frame anchor extending upwardly from the horizontal foot,
the horizontal foot sized to extend under the spa when the lower frame anchor is secured to the lower internal frame of the spa.

Item 6: The spa accessory mounting assembly of any preceding item, wherein:
each of the upper and lower frame anchors has a spa-facing rear side and an outward-facing front side, and
each of the upper and lower frame anchors comprises a spa-mounting portion and at least one sleeve engaging portion, the spa-mounting portion extending rearwardly of each sleeve engaging portion.

Item 7: The spa accessory mounting assembly of any preceding item, wherein:
the at least one sleeve engaging portion of each of the upper and lower frame anchors includes first and second sleeve engaging portions that extend laterally outwardly of the spa-mounting portion.

Item 8: The spa accessory mounting assembly of any preceding item, wherein:
the at least one sleeve engaging portion of the upper and lower frame anchors defines a vertically extending track that is received in the bridging sleeve when the bridging sleeve overlays the upper and lower frame anchors.

Item 9: The spa accessory mounting assembly of any preceding item, wherein:
the bridging sleeve defines a vertically extending anchor slot bounded by an outward facing front wall and at least one spa-facing rear walls, and
when the bridging sleeve is overlying the upper and lower frame anchors, the upper and lower frame anchors are received in the anchor slot.

Item 10: The spa accessory mounting assembly of any preceding item, wherein:
the bridging sleeve further comprises an upper wall that bounds the anchor slot, the upper wall seating atop the upper frame anchor when the bridging sleeve is overlying the upper and lower frame anchors.

Item 11: The spa accessory mounting assembly of any preceding item, wherein:
the bridging sleeve has an outward facing front wall, and
the bridging sleeve has two laterally spaced apart, vertically extending C-channels, each C-channel defined by the front wall, a respective lateral sidewall, and a respective spa-facing rear wall.

Item 12: The spa accessory mounting assembly of any preceding item, wherein:
the accessory mount comprises a sleeve engaging portion, and an accessory engaging portion, the accessory engaging portion extending forward of the sleeve engaging portion.

Item 13: The spa accessory mounting assembly of any preceding item, wherein:

the accessory engaging portion comprises a mounting bracket for a spa cover lifter.

Item 14: The spa accessory mounting assembly of any preceding item, wherein:

the accessory engaging portion comprises a horizontal mounting channel.

Item 15: The spa accessory mounting assembly of any preceding item, wherein:

the accessory engaging portion comprises an umbrella mount.

Item 16: The spa accessory mounting assembly of any preceding item, wherein:

the accessory mount comprises a sleeve engaging portion, and a towel rack extending forwardly of the sleeve engaging portion.

Item 17: The spa accessory mounting assembly of any preceding item, wherein:

the accessory mount comprises a sleeve engaging portion, and a spa accessory extending forwardly of the sleeve engaging portion.

Item 18: The spa accessory mounting assembly of any preceding item, wherein:

the sleeve engaging portion comprises first and second laterally spaced apart C-channels that receive the bridging sleeve as the accessory mount slides vertically along the bridging sleeve.

Item 19: The spa accessory mounting assembly of any preceding item, wherein:

the lower frame anchor has a height of between 25% and 75% of a height of the bridging sleeve.

Item 20: A spa accessory mounting assembly comprising:

an upper frame anchor securable to an upper internal frame of a spa;

a lower anchor having a horizontal foot positionable under a spa;

a bridging sleeve sized and shaped to mount to both the upper frame anchor and lower anchor when the upper frame anchor is spaced vertically above the lower anchor; and an accessory mount connected to the bridging sleeve and moveable along a height of the bridging sleeve.

Item 21: A spa accessory mounting assembly comprising:

a lower anchor having a horizontal foot positionable under a spa;

an upright support having a lower portion connected to the lower anchor, and an upper end positioned above the lower anchor; and an accessory mount connected to the upright support, wherein at least one of:

the upright support is movable relative to the lower anchor between at least two upright support elevations, and the upright support is rigidly connectable to the lower anchor at each of the upright support elevations, and the accessory mount is movable relative to the upright support between at least two accessory mount elevations, and the accessory mount is rigidly connectable to the upright support at each of the accessory mount elevations.

Item 22: The spa accessory mounting assembly of any preceding item, wherein the upright support is movable relative to the lower anchor between the at least two upright support elevations, and the upright support is rigidly connectable to the lower anchor at each of the upright support elevations, and the accessory mount is movable relative to the upright support between the at least two accessory mount elevations, and the accessory mount is rigidly connectable to the upright support at each of the accessory mount elevations.

Item 23: The spa accessory mounting assembly of any preceding item, wherein the upright support is freestanding from the lower anchor, absent destructive fasteners for fastening the upright support to a spa.

Item 24: The spa accessory mounting assembly of any preceding item, wherein the lower anchor includes an upstanding bracket extending upwardly of the horizontal foot, and the lower portion of the upright support is connected to the upstanding bracket.

Item 25: The spa accessory mounting assembly of any preceding item, wherein:

the lower portion of the upright support is slidable relative to the upstanding bracket between the at least two upright support elevations.

Item 26: The spa accessory mounting assembly of any preceding item, wherein:

the lower portion of the upright support is received in the upstanding bracket when the upright support is rigidly connectable to the lower anchor.

Item 27: The spa accessory mounting assembly of any preceding item, wherein:

the accessory mount includes an upright support engaging portion that is selectively rigidly connectable to the upright support at each of the two or more accessory mount elevations.

Item 28: The spa accessory mounting assembly of any preceding item, wherein:

the accessory mount overlays the upright support and is slidable relative to the upright support between the at least two upright support elevations.

Item 29: The spa accessory mounting assembly of any preceding item, wherein:

the accessory mount comprises an upright support engaging portion, and an accessory engaging portion, the accessory engaging portion extending forward of the upright support engaging portion.

Item 30: The spa accessory mounting assembly of any preceding item, wherein:

the accessory engaging portion comprises a mounting bracket for a spa cover lifter.

Item 31: The spa accessory mounting assembly of any preceding item, wherein:

the accessory engaging portion comprises a horizontal mounting channel.

Item 32: The spa accessory mounting assembly of any preceding item, wherein:

the accessory engaging portion comprises an umbrella mount.

Item 33: The spa accessory mounting assembly of any preceding item, wherein:

the accessory mount comprises an upright support engaging portion, and a towel rack extending forwardly of the upright support engaging portion.

Item 34: The spa accessory mounting assembly of any preceding item, wherein:

the accessory mount comprises an upright support engaging portion, and a spa accessory extending forwardly of the upright support engaging portion.

Item 35: The spa accessory mounting assembly of any preceding item, wherein:

the accessory mount engaging portion comprises first and second laterally spaced apart C-channels that receive the upright support as the accessory mount slides vertically along the upright support.

Item 36: The spa accessory mounting assembly of any preceding item, wherein:

the lower anchor has a height of between 15% and 50% of a height of the upright support.

The invention claimed is:

1. A spa assembly comprising:

first and second spa accessory mounting assemblies, each spa accessory mounting assembly comprising:

a lower anchor having a horizontal foot positionable under a spa, an upright support having a lower portion connected to the lower anchor, and an upper end positioned above the lower anchor, wherein a majority of the horizontal foot is located rearwardly of the upright support, and an accessory mount connected to the upright support such that the accessory mount is inhibited from rotating relative to the upright support, the accessory mount comprising an upright support engaging portion- and an accessory engaging portion, wherein the accessory engaging portion extends forwardly of the upright support and the accessory engaging portion comprises a horizontal mounting channel oriented in a lateral direction that is transverse to both forward-rearward and upward-downward directions to provide a lateral accessory insertion direction, wherein the accessory mount is slidable relative to the upright support between at least two accessory mount elevations, the accessory mount is rigidly connectable to the upright support at each of the accessory mount elevations, and when the accessory mount is positioned at a first of the at least two accessory mount elevations, the accessory mount is located below an upper end of the upright support; and first and second spa cover lifters the first spa cover lifter connected to the accessory engaging portion of the accessory mount of the first spa accessory mounting assembly, the second spa cover lifter connected to the accessory engaging portion of the accessory mount of the second spa accessory mounting assembly.

2. The spa assembly of claim 1, wherein:

the upright support engaging portion extends above the accessory engaging portion.

3. The spa assembly of claim 2, wherein:

the upright support engaging portion extends below the accessory engaging portion.

4. The spa assembly of claim 1, wherein:

the upright support is movable relative to the lower anchor between at least two upright support elevations, and the upright support is rigidly connectable to the lower anchor at each of the upright support elevations.

5. The spa assembly of claim 1, wherein:

the upright support and the lower anchor are collectively freestanding, absent destructive fasteners for fastening the upright support to a spa.

6. The spa assembly of claim 1, wherein:

the accessory engaging portion comprises a cover lifter mounting bracket.

7. The spa assembly of claim 1, wherein:

the lower anchor has a height of between 15% and 50% of a height of the upright support.

8. The spa assembly of claim 1, further comprising:

a connecting portion extending between the first cover lifter and the second cover lifter, the connecting portion connecting the first cover lifter to the second cover lifter.

9. The spa assembly of claim 1, wherein:

the first spa cover lifter is moveable relative to the accessory mount of the first spa accessory mounting assembly between at least two horizontal positions and is rigidly connectable to the first spa accessory mounting assembly at each of the horizontal positions of the first spa cover lifter, and the second spa cover lifter is moveable relative to the accessory mount of the second spa accessory mounting assembly between at least two horizontal positions and is rigidly connectable to the second spa accessory mounting assembly at each of the horizontal positions of the second spa cover lifter.

10. A spa assembly comprising:

first and second spa accessory mounting assemblies, each spa accessory mounting assembly comprising:

a lower anchor having a horizontal foot positionable under a spa, an upright support having a lower portion connected to the lower anchor, and an upper end positioned above the lower anchor, wherein a majority of the horizontal foot is located rearwardly of the upright support, and an accessory mount connected to the upright support, the accessory mount comprising an upright support engaging portion rigidly connected to an accessory engaging portion, wherein the accessory engaging portion extends forwardly of the upright support and the accessory engaging portion comprises a horizontal mounting channel oriented in a lateral direction that is transverse to both forward-rearward and upward-downward directions to provide a lateral accessory insertion direction, wherein the accessory mount is slidable relative to the upright support between at least two accessory mount elevations, and the accessory mount is rigidly connectable to the upright support at each of the accessory mount elevations; and first and second spa cover lifters, the first spa cover lifter connected to the accessory engaging portion of the accessory mount of the first spa accessory mounting assembly, the second spa cover lifter connected to the accessory engaging portion of the accessory mount of the second spa accessory mounting assembly.

11. The spa assembly of claim 10, wherein:

the upright support engaging portion extends above the accessory engaging portion.

12. The spa assembly of claim 10, wherein:

the upright support and the lower anchor are collectively freestanding, absent destructive fasteners for fastening the upright support to a spa.

13. The spa assembly of claim 10, further comprising:

a connecting portion extending between the first cover lifter and the second cover lifter, the connecting portion connecting the first cover lifter to the second cover lifter.

14. The spa assembly of claim 10, wherein:

the first spa cover lifter is moveable relative to the accessory mount of the first spa accessory mounting assembly between at least two horizontal positions and is rigidly connectable to the first spa accessory mounting assembly at each of the horizontal positions of the first spa cover lifter, and the second spa cover lifter is moveable relative to the accessory mount of the second spa accessory mounting assembly between the at least two horizontal positions and is rigidly connectable to the second spa accessory mounting assembly at each of the horizontal positions of the second spa cover lifter.

15. A spa assembly comprising:

first and second spa accessory mounting assemblies, each spa accessory mounting assembly comprising:

a lower anchor having a horizontal foot positionable under a spa, an upright support having a lower portion connected to the lower anchor, and an upper end positioned above the lower anchor, wherein a majority of the horizontal foot is located rearwardly of the upright support, and an accessory mount connected to the upright support, the accessory mount comprising an upright support engaging portion integrally formed with an accessory engaging portion, wherein the accessory engaging portion extends forwardly of the upright support and the accessory engaging portion comprises a horizontal mounting channel oriented in a lateral direction that is transverse to both forward-rearward and upward-downward directions to provide a lateral accessory insertion direction, wherein the accessory mount is slidable relative to the upright support between at least two accessory mount elevations, and the accessory mount is rigidly connectable to the upright support at each of the accessory mount elevations; and first and second spa cover lifters, the first spa cover lifter connected to the accessory engaging portion of the accessory mount of the first spa accessory mounting assembly, the second spa cover lifter connected to the accessory engaging portion of the accessory mount of the second spa accessory mounting assembly.

16. The spa assembly of claim 15, wherein:

the upright support engaging portion extends above the accessory engaging portion.

17. The spa assembly of claim 15, wherein:

the upright support and the lower anchor are collectively freestanding, absent destructive fasteners for fastening the upright support to a spa.

18. The spa assembly of claim 15, wherein:

when the accessory mount is positioned at a first of the at least two accessory mount elevations, the accessory mount is located below an upper end of the upright support.

19. The spa assembly of claim 15, further comprising:

a connecting portion extending between the first cover lifter and the second cover lifter, the connecting portion connecting the first cover lifter to the second cover lifter.

20. The spa assembly of claim 15, wherein:

the first spa cover lifter is moveable relative to the accessory mount of the first spa accessory mounting assembly between at least two horizontal positions and is rigidly connectable to the first spa accessory mounting assembly at each of the horizontal positions of the first spa cover lifter, and the second spa cover lifter is moveable relative to the accessory mount of the second spa accessory mounting assembly between the at least two horizontal positions and is rigidly connectable to the second spa accessory mounting assembly at each of the horizontal positions of the second spa cover lifter.

* * * * *